United States Patent
Nishida

(10) Patent No.: US 9,544,262 B2
(45) Date of Patent: Jan. 10, 2017

(54) SYSTEM, METHOD, AND APPARATUS FOR DATA PROCESSING

(71) Applicant: Takayori Nishida, Tokyo (JP)

(72) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 280 days.

(21) Appl. No.: 14/268,019

(22) Filed: May 2, 2014

(65) Prior Publication Data

US 2014/0337445 A1 Nov. 13, 2014

(30) Foreign Application Priority Data

May 10, 2013 (JP) .................................. 2013-099972

(51) Int. Cl.
- G06F 3/12 (2006.01)
- G06F 21/31 (2013.01)

(Continued)

(52) U.S. Cl.
CPC ............. *H04L 51/28* (2013.01); *G06F 21/608* (2013.01); *H04N 1/4413* (2013.01);

(Continued)

(58) Field of Classification Search
CPC .................. H04N 2201/0094; H04N 1/00244; H04N 2201/0082; H04N 1/00204; H04N 2201/0039; H04N 2201/0081; G06F 3/1288; G06F 3/1285; G06F 3/1204; G06F 3/1205; G06F 3/1222; G06F 3/1238; G06F 21/608; G06F 17/30011; G06F 3/1247; G06F 3/1267; G06F 3/1208; G06F 3/1203; G06F 3/1253; G06F 3/126

(Continued)

(56) References Cited

U.S. PATENT DOCUMENTS

| 8,566,355 B2* | 10/2013 | Jeong | G06Q 40/12 |
| | | | 707/787 |
| 8,953,209 B2* | 2/2015 | Ida | G06F 3/1222 |
| | | | 358/1.13 |

(Continued)

FOREIGN PATENT DOCUMENTS

| JP | 2001-051915 | 2/2001 |
| JP | 2004-236348 | 8/2004 |

(Continued)

OTHER PUBLICATIONS

Extended European search report dated Jul. 31, 2014.

*Primary Examiner* — Patrice Winder
*Assistant Examiner* — Abderrahmen Chouat
(74) *Attorney, Agent, or Firm* — Ipusa, PLLC

(57) ABSTRACT

A data process system including a unit receiving a mail data including an output data or a target output data via a network, a unit identifying a user-identification data to be associated with the output data based on an address data of a transmission source of the mail data by referring to first and second units, the first unit storing a first address data in correspondence with each user-identification data, the second unit storing a second address data in correspondence with each user-identification data, a unit storing data-identification data in correspondence with the output data in a unit in a case where the user-identification data is identified by referring to the second unit instead of by the first unit, a unit notifying the data-identification data via the network, and a unit transmitting the output data corresponding to the user-identification data or the data-identification data received via the network.

12 Claims, 28 Drawing Sheets

(51) Int. Cl.
  *G06F 12/00* (2006.01)
  *H04N 1/21* (2006.01)
  *H04L 12/58* (2006.01)
  *H04N 1/44* (2006.01)
  *G06F 21/60* (2013.01)

(52) U.S. Cl.
  CPC ........... *H04N 2201/0094* (2013.01); *H04N 2201/3205* (2013.01); *H04N 2201/3276* (2013.01)

(58) Field of Classification Search
  USPC ....... 709/224, 203, 223, 217, 206, 219, 220,
    709/201, 228, 226, 227, 230, 225, 202,
    709/246, 218, 221, 229, 204, 208, 245,
    709/205, 207, 222, 232, 250, 213, 238,
    709/209, 216, 234, 237, 244, 249, 200,
    709/231, 233, 236, 247, 212, 239, 240,
    709/248, 253, 211, 2
  See application file for complete search history.

(56) References Cited

U.S. PATENT DOCUMENTS

| | | | | |
|---|---|---|---|---|
| 2002/0018237 | A1* | 2/2002 | Okada | H04N 1/00 358/1.15 |
| 2004/0001226 | A1 | 1/2004 | Ohtuka | |
| 2004/0130743 | A1 | 7/2004 | Nozato | |
| 2007/0253013 | A1* | 11/2007 | Shudo | G06F 21/608 358/1.14 |
| 2012/0300268 | A1 | 11/2012 | Oseto et al. | |
| 2013/0094053 | A1* | 4/2013 | Shirai | G06F 3/1222 358/1.15 |
| 2013/0242335 | A1* | 9/2013 | Naitoh | G06K 15/405 358/1.14 |
| 2013/0329245 | A1 | 12/2013 | Nishida | |

FOREIGN PATENT DOCUMENTS

JP    2012-248006    12/2012
JP    2014-016979    1/2014

* cited by examiner

FIG.6

| USER NAME | PASSWORD | MAIL ADDRESS | ⋯⋯ |
|---|---|---|---|
| A | ⋯⋯ | aaa@xxxxx | ⋯⋯ |
| B | ⋯⋯ | bbb@xxxxx | ⋯⋯ |
| ⋮ | ⋮ | ⋮ | ⋮ |

FIG.7

| JOB NAME | USER MODE | USER NAME | PIN CODE | PRINT DATA | ... |
|---|---|---|---|---|---|
| XXX | G | A | 1234 | ... | ... |
| YYY | U | A |  | ... | ... |
| .. | .. | .. | .. | .. | .. |

| GUEST MAIL ADDRESS | REGULAR USER NAME | MANAGEMENT CODE | PIN CODE |
|---|---|---|---|
| xxx01@yyy01.zzz01 | A | 5432 | 1111 |
| xxx02@yyy02.zzz02 | A | 5432 | 12345 |
| xxx03@yyy03.zzz03 | B | 10234 | |
| xxx04@yyy04.zzz04 | A | 5432 | 3126 |
| xxx05@yyy05.zzz05 | C | 4632 | 74342 |
| xxx06@yyy06.zzz06 | D | 214043 | 52754 |
| xxx07@yyy07.zzz07 | E | 323464 | |

FIG.13

| COMPANY CODE | RECEPTION ADDRESS |
|---|---|
| COMPANY 1 | office1@cloud.co.jp |
| COMPANY 2 | office2@cloud.co.jp |
| COMPANY 3 | office3@cloud.co.jp |
| : | : |

| JOB NAME | USER MODE | USER NAME | PIN CODE | PRINT DATA | COMPANY CODE | ... |
|---|---|---|---|---|---|---|
| XXX | G | A | 1234 | ... | COMPANY 1 | ... |
| ZZZ | U | B | | ... | COMPANY 2 | ... |
| .. | .. | .. | .. | .. | .. | .. |

| COMPANY CODE | DEVICE ID |
|---|---|
| COMPANY 1 | ... |
| COMPANY 1 | ... |
| : | : |
| COMPANY 2 | ... |
| : | : |

| ORGANIZATION CODE | USER NAME | PASSWORD | MAIL ADDRESS | ROLE | 733 |
|---|---|---|---|---|---|
| COMPANY 1 | A | ..... | aaa@xxxxx | ADMINISTRATOR | ..... |
| | B | ..... | bbb@xxxxx | USER | ..... |
| | .. | .. | .. | .. | .. |
| COMPANY 2 | .. | .. | .. | .. | .. |

| ORGANIZATION CODE | PIN CODE | USER NAME |
|---|---|---|
| XXX | 100 | A |
| YYY | 101 | ... |
| YYY | 102 | ... |
| XXX | 103 | ... |

FIG.28

| ORGANIZATION CODE | USER NAME | PASSWORD |
|---|---|---|
| XXX | A | ... |
| YYY | B | ... |

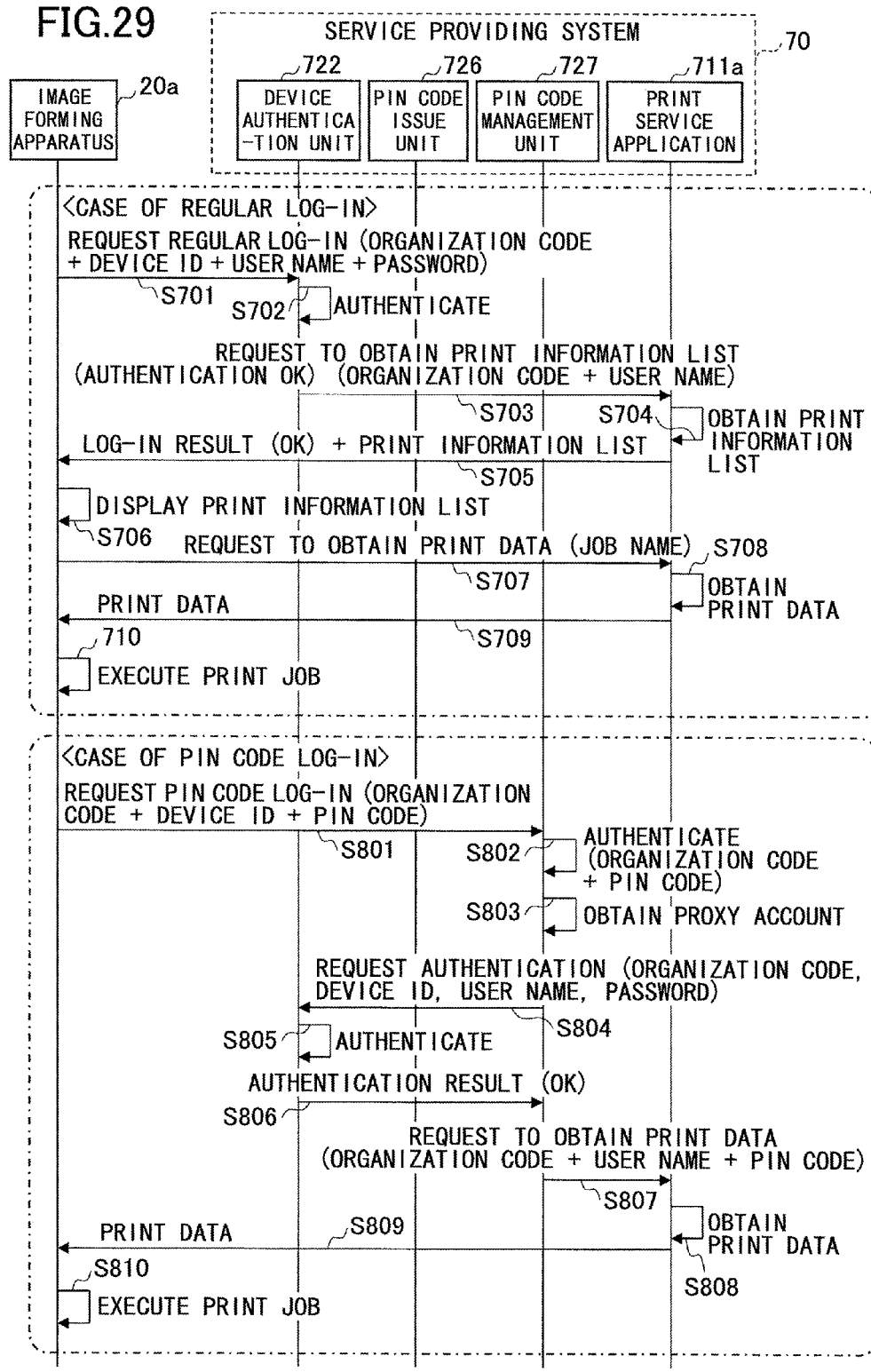

SYSTEM, METHOD, AND APPARATUS FOR DATA PROCESSING

BACKGROUND OF THE INVENTION

1. Field of the Invention

The present invention relates to a system, a method, and an apparatus for data processing.

2. Description of the Related Art

Conventionally, in a case where a printing instruction is input from a user by way of, for example, a PC (Personal Computer), there is a system that associates print data in association with a user name of the user and stores the print data in a predetermined server or a storage device of an image forming apparatus instead of immediately printing the print data in response to the printing instruction. In this system, when the user inputs a user name and password to the image forming apparatus via an operation panel, the image forming apparatus performs an authentication process on the user name and the password. Among the print data stored in the storage device of the image forming apparatus, print data associated to the user is displayed as a list on the operation panel by the image forming apparatus when the authentication is a success. When print data is selected from the list of print data, the image forming apparatus obtains the selected print data from the storage device and prints the print data.

With this system, printed material is output when the user is nearby the image forming apparatus. Therefore, problems such as leaving the printed material on the image forming apparatus or inadvertently taking someone else's printed material can be prevented. As a result, security of printed information can be ensured.

RELATED ART DOCUMENT

Patent Document 1: Japanese Laid-Open Patent Publication No. 2004-236348
Patent Document 2: Japanese Laid-Open Patent Publication No. 2001-051915

However, with this system, printing can only be performed for a user that already has an account for performing authentication. Therefore, in a case where a customer or the like has no account, there is an inconvenience of the customer requiring to ask someone having an account to print the print data. In this case, a guest account that can be shared by customers may be prepared. However, because the shared guest account is assigned to multiple customers, one customer may be able to manipulate another customer's print data. This degrades the system's characteristic of ensuring security of printed data.

Although it is possible to install an image forming apparatus that can be used by guests, this is not a satisfactory countermeasure because cost will increase and installation space of the image forming apparatus is required.

SUMMARY OF THE INVENTION

The present invention may provide a system, a method, and an apparatus for data processing that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description.

Objects as well as other features and advantages of the present invention will be realized and attained by a system, a method, and an apparatus for data processing particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data process system including one or more data process apparatuses, the data process system including: a reception unit configured to receive a mail data including an output data or a target output data via a network; an identification unit configured to identify a user-identification data to be associated with the output data based on an address data of a transmission source of the mail data by referring to first and second storage units, the first storage unit storing a first address data in correspondence with each user-identification data, the second storage unit storing a second address data in correspondence with each user-identification data; a storage unit configured to store data-identification data in correspondence with the output data in a data storage unit in a case where the user-identification data is identified by referring to the second storage unit instead of by the first storage unit; a notification unit configured to notify the data-identification data via the network; and a transmission unit configured to transmit the output data corresponding to the user-identification data or the data-identification data received via the network.

Other objects, features and advantages of the present invention will become more apparent from the following detailed description when read in conjunction with the accompanying drawings.

BRIEF DESCRIPTION OF THE DRAWINGS

FIG. 6 is a schematic diagram illustrating a configuration of a user data storage unit according to an embodiment of the present invention;

FIG. 7 is a schematic diagram illustrating a configuration of a print information storage unit according to the first embodiment of the present invention;

FIG. 9 is a schematic diagram illustrating a configuration of a guest data storage unit according to an embodiment of the present invention;

FIG. 13 is a schematic diagram illustrating a configuration of the address correspondence data storage unit 18 according to an embodiment of the present invention;

FIG. 14 is a schematic diagram illustrating a configuration of a print information storage unit 62 according to the second embodiment of the present invention;

FIG. 15 is a schematic diagram illustrating a configuration of the user device data storage unit 64 according to an embodiment of the present invention;

FIG. 20 is a schematic diagram illustrating a configuration of the user data storage unit 733 according to the fourth embodiment of the present invention;

FIG. 28 is a schematic diagram illustrating a configuration of a substitute account management table according to an embodiment of the present invention; and FIG. 29 is a diagram for describing a sequence of processes for outputting print data according to an embodiment of the present invention.

DETAILED DESCRIPTION OF THE PREFERRED EMBODIMENTS

Figure 1:
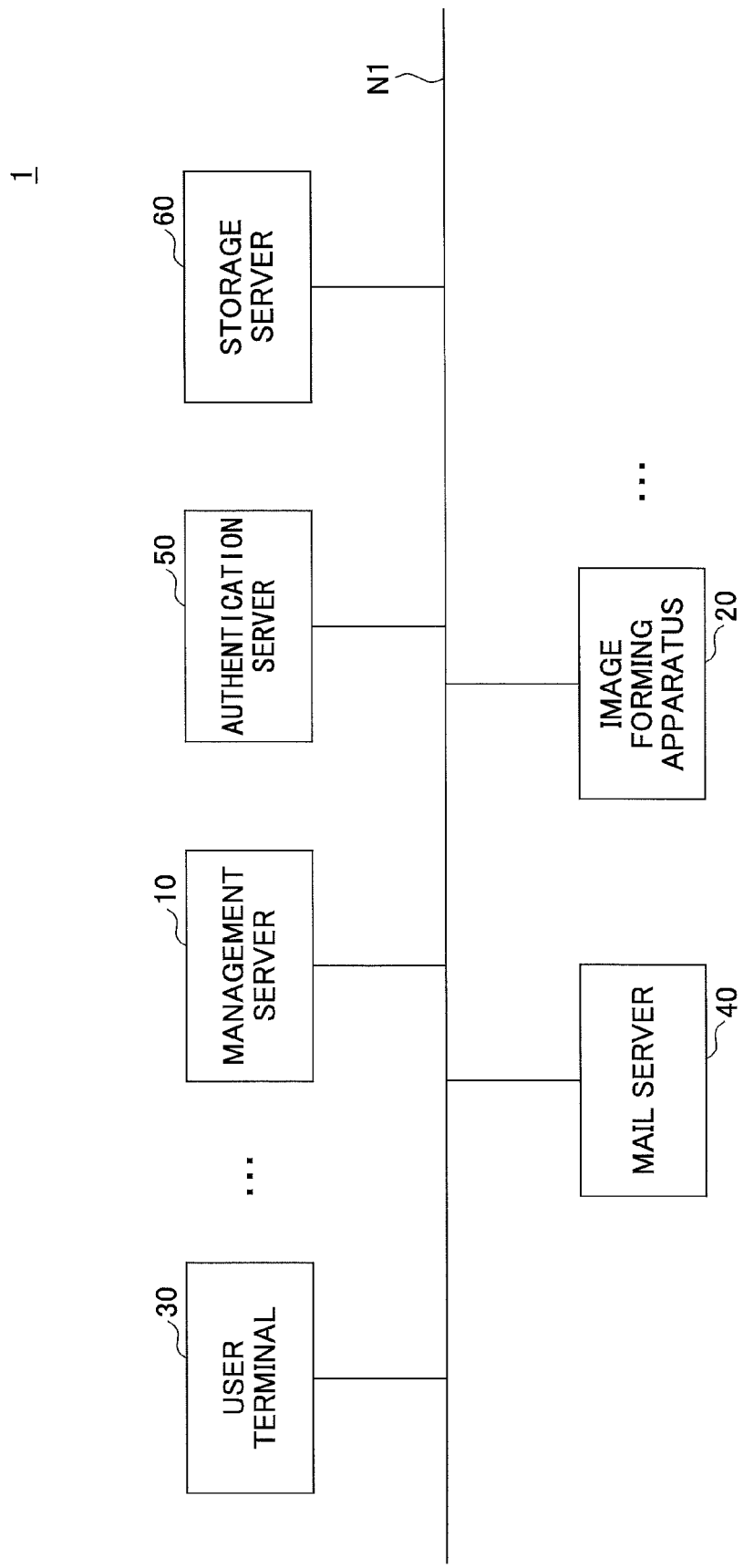
FIG. 1 is a schematic diagram illustrating a configuration of a printing system according to a first embodiment of the present invention.

Next, embodiments of the present invention are described with reference to the accompanying drawings. FIG. 1 is a schematic diagram illustrating a configuration of a printing system 1 according to a first embodiment of the present invention. The printing system 1 illustrated in FIG. 1 includes, for example, one or more user terminals 30, a mail server 40, a management server 10, an authentication server 50, a storage server 60, and one or more image forming apparatuses 20 that are communicably connected to each other via a network N1 such as a LAN (Local Area Network) or the Internet. The network N1 may be partly or entirely constituted by a wireless communication network. Further, a mobile communication network may be provided between the user terminal 30 and the network N1. It is to be noted that the printing system 1 is operated inside an organization such as a company. In the first embodiment, the organization is referred to as "company A".

The user terminal 30 is a data processing apparatus on which the user of the printing system 1 directly operates for inputting printing requests to the printing system 1. A PC (Personal Computer), a mobile phone, a smartphone, a table type terminal, and a PDA (Personal Digital Assistance) are examples of the user terminal 30. In a case where the system includes multiple user terminals 30, each of the user terminals 30 may be different kinds of terminals.

In this embodiment, the users of the printing system 1 are categorized into a "regular user (qualified user)" and a "guest user". The "regular user" is a user whose information (data) is registered in the printing system 1 (technically, registered in the below-described user data storage unit 52). That is, the "regular user" is a user expected to be a user of the printing system 1. One example of the regular user is an employee of company A. The "guest user" is a user whose information is not registered in the printing system 1. That is, the guest user is a user that does not initially have the authority to use the printing system 1. One example of the guest user is a person other than an employee of company A.

The mail server 40 is a computer that transfers, for example, electronic mail transmitted from the user terminal 30 or from the management server 10. For example, the user terminal 30 transmits electronic mail including a print request to the management server 10 in response to an instruction from the user. Electronic data that is to be printed (target print data) is attached to the electronic mail including the print request. The data format of the electronic data is not limited to a particular format. The electronic mail that includes the print request and is transmitted from the user terminal 30 may also be hereinafter referred to as "print request mail".

The authentication server 50 is a computer that manages data of each user of company A (user data) and performs various processes using the user data. For example, the authentication server 50 performs an authentication process in response to an authentication request including, for example, a designated user name and a designated password. Further, the authentication server 50 performs various processes corresponding to requests such as a request to confirm existence of an e-mail address or a request to obtain a user name corresponding to an e-mail address. That is, the user data is associated to a user name and includes an e-mail address of the user.

The management server 10 is a computer that performs processes such as generation of print data pertaining to the electronic data included in the print request mail upon receiving the print request mail. The data format of the print data is a format that can be interpreted by the image forming apparatus 20. The management server 10 associates the generated print data with respect to a user name of a user of a transmission source (sender) from which the print request mail is transmitted, or with respect to an identifier generated in correspondence with each print request mail. Then, the management server 10 transmits the associated print data to the storage server 60. In a case where the authentication server 50 manages addresses of transmission sources of print request mail in correspondence with user names, print data are associated with user names. In a case where the authentication server 50 does not manage addresses of transmission sources of print request mail in correspondence with user names, print data are associated with identifiers generated in correspondence with each print request mail. The identifier may also be hereinafter referred to as a "PIN (Personal Identification Number) code".

The storage server 60 is a computer that stores the print data transmitted from the management server 10.

The image forming apparatus 20 is an apparatus that performs a printing process on the print data associated with a user name or a PIN code input to the image forming apparatus by the user.

Figure 2:
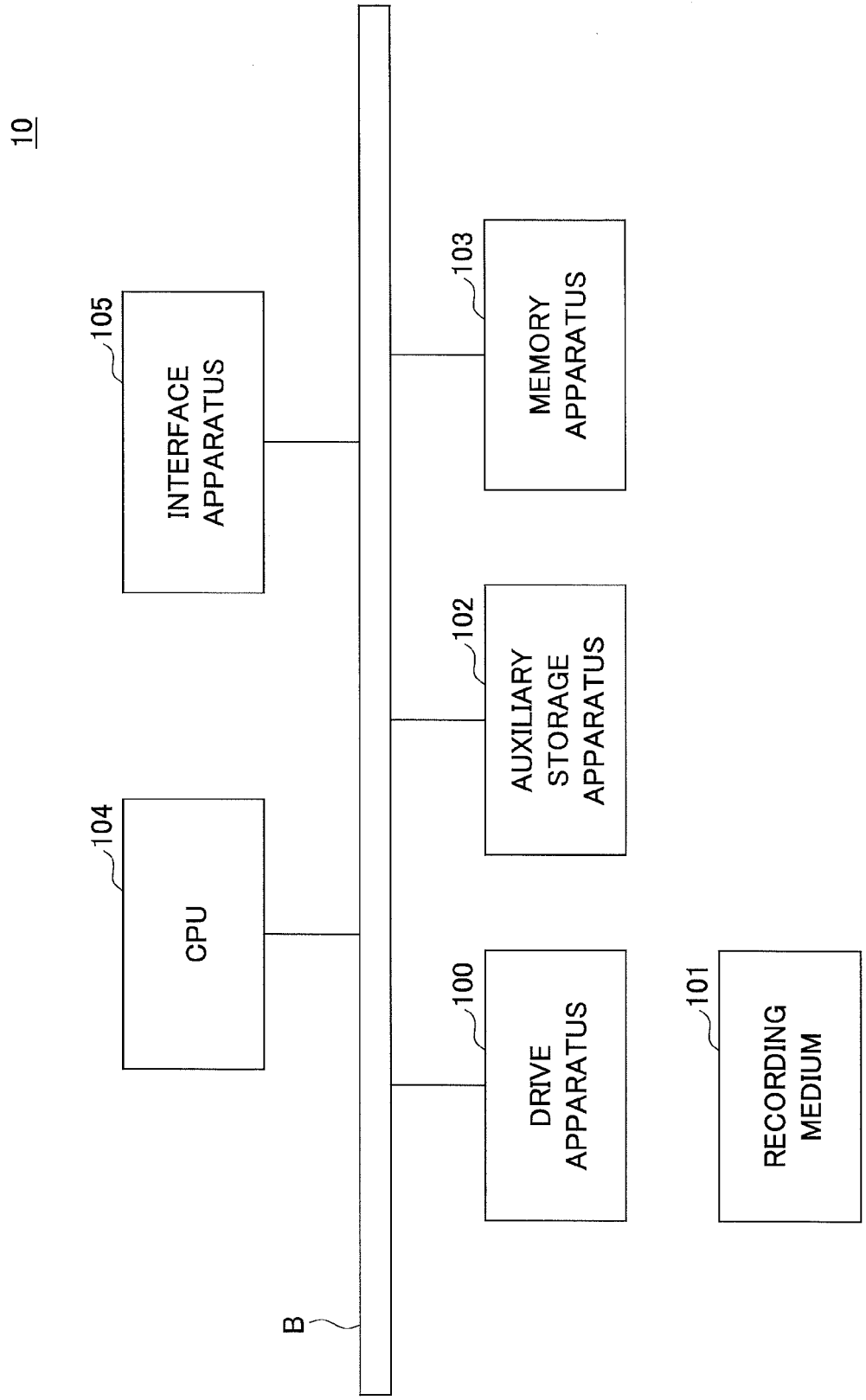
FIG. 2 is a schematic diagram illustrating a hardware configuration of a management server according to the first embodiment of the present invention.

FIG. 2 is a schematic diagram illustrating a hardware configuration of the management server 10 according to the first embodiment of the present invention. The management server 10 of FIG. 2 includes, for example, a drive apparatus 100, an auxiliary storage apparatus 102, a memory apparatus 103, a CPU (Central Processing Unit) 104, and an interface apparatus 105 that are connected to each other by a bus B.

A program that implements the processes of the management server 10 is provided from a recording medium 101 such as a CD-ROM. When the recording medium 101 having the program recorded therein is set to the drive apparatus 100, the program is installed from the recording medium 101 to the auxiliary storage apparatus 102 via the drive apparatus 100. However, the program does not necessarily have to be installed from the recording medium 101. For example, the program may be downloaded to another computer via a network. The auxiliary storage apparatus 102 not only stores the installed program but also stores, for example, necessary files and data.

In a case where activation of the program is instructed, the memory apparatus 103 reads out the program from the auxiliary storage apparatus 102 and stores the program therein. The CPU 104 executes the functions of the management server 10 in accordance with the program stored in the memory apparatus 103. The interface apparatus 105 is used as an interface to be connected to a network.

Figure 3:
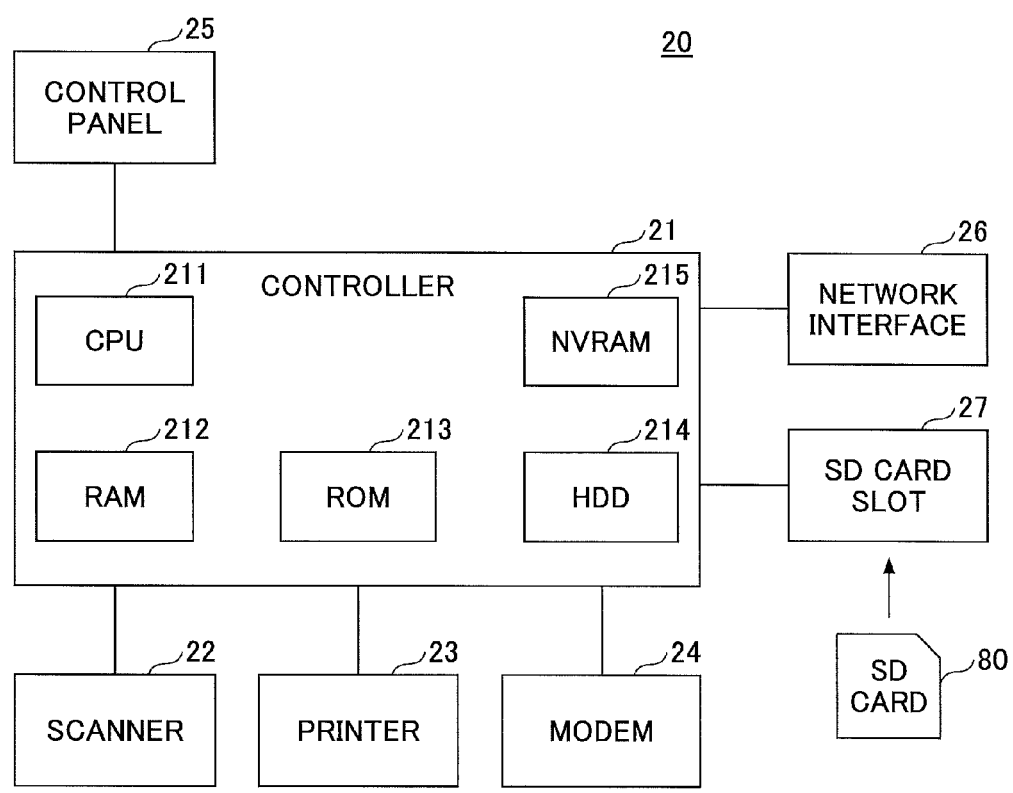
FIG. 3 is a schematic diagram illustrating a hardware configuration of an image forming apparatus according to the first embodiment of the present invention.

FIG. 3 is a schematic diagram illustrating a hardware configuration of the image forming apparatus 20 according to the first embodiment of the present invention. The image forming apparatus 2 of FIG. 3 includes hardware such as a controller 21, a scanner 22, a printer 23, a modem 24, an operation panel 25, a network interface 26, and an SD card slot 27.

The controller 21 includes, for example, a CPU 211, a RAM (Random Access Memory) 212, a ROM (Read Only Memory) 213, a HDD (Hard Disk Drive) 214, and a NVRAM (Non-Volatile RAM) 215. The ROM 213 stores, for example, various programs and data used by the programs therein. The RAM 212 may be used as a storage space to which programs are loaded or as a work space of the loaded programs. The CPU 211 implements various functions by performing the processes of the programs loaded to the RAM 212. The HDD 214 stores, for example, programs and data used by the programs therein. The NVRAM 215 stores, for example, data pertaining to various settings.

The scanner 22 is a hardware device for reading image data from a document (image reading unit). The printer 23 is a hardware device for printing print data to a print document (printing unit). The modem 24 is a hardware device for connecting to a telephone line. The modem 24 is used for transmitting/receiving image data by way of facsimile communications. The operation panel 25 is a hardware device including, for example, an input unit for accepting input from the user or a display unit such as a liquid crystal panel. The liquid crystal panel may have a touch-panel function. In this case, the liquid crystal panel also provides the functions of an input unit. The network interface 26 is a hardware device for connecting to a network (by wireless, cable, or both) such as a LAN (Local Area Network). The SD (Secure Digital) card slot 27 is used for reading a program stored in a SD card 80. That is, not only is a program recorded in the ROM 213 but also a program recorded in the SD card 80 is loaded to the RAM 212, so that processes of the program can be executed by the image forming apparatus 20. It is to be noted that the SD card 80 may be replaced with other recording media (e.g., CD-ROM, USB (Universal Serial Bus) memory). That is, the type of recording media equivalent to the SD card 80 is not to be limited in particular. In this case, the SD card slot 27 may be replaced with hardware corresponding to the type of recording medium that is used.

It is to be noted that the image forming apparatus 20 may be provided without including the scanner 22 and the modem 24. That is, the image forming apparatus 20 may be a printer instead of a multifunction peripheral.

Figure 4:
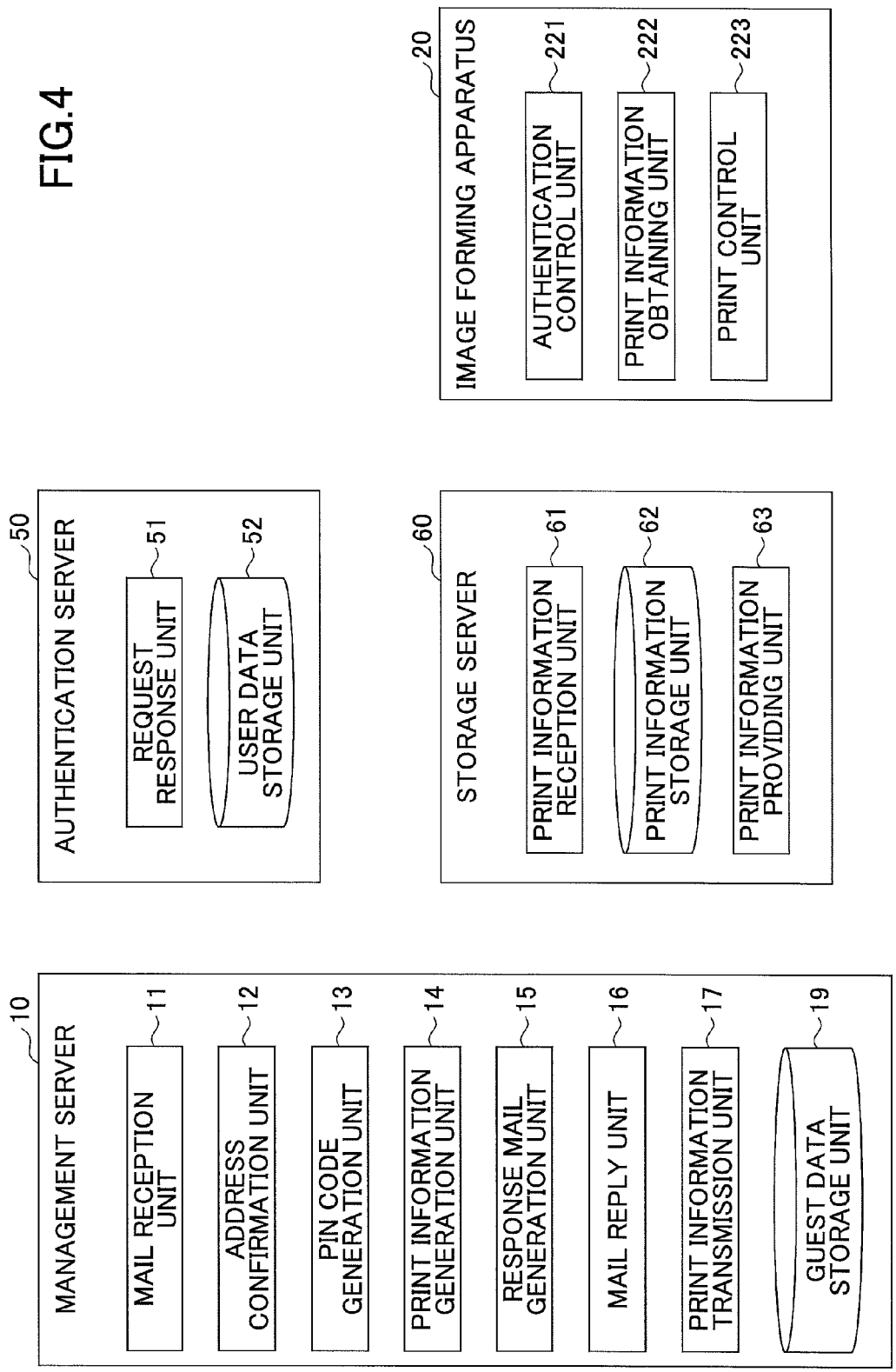
FIG. 4 is a schematic diagram illustrating a functional configuration of a printing system according to the first embodiment of the present invention.

FIG. 4 is a schematic diagram illustrating a functional configuration of a printing system according to the first embodiment of the present invention. The management server 10 of FIG. 4 includes, for example, a mail reception unit 11, an address confirmation unit 12, a PIN code generation unit 13, a print information generation unit 14, a response mail generation unit 15, a mail reply unit 16, and a print information transmission unit 17. The functions of these units included in the management server 10 are implemented by causing the CPU 104 to execute processes of the one or more programs installed in the management server 10.

The management server 10 also includes a guest data storage unit 19. The functions of the guest data storage unit 19 are implemented by using, for example, the auxiliary storage device 102 or a storage device connected to the management server 10 via a network.

The mail reception unit 11 receives print request mail. The print request mail includes target print data desired to be printed by the user (e.g., body text of electronic mail, file attached electronic mail). For example, the user transmits an electronic mail including the target print data from the user terminal 30 to a mail address of a particular domain (transmission destination). The mail reception unit 11 recognizes that the electronic mail from the user terminal 30 is a print request mail by confirming that the address of the electronic mail is set with the particular domain.

The address confirmation unit 12 transmits a request to confirm existence of a transmission source address of the print request mail to the authentication server 50 for determining whether the transmission source address is registered in the authentication server 50. In a case where the transmission source address is registered in the authentication server 50, the address confirmation unit 12 obtains a user name corresponding to the transmission source address from the authentication server 50. In a case where the transmission source address is not registered in the authentication server 50, the PIN code generation unit 13 generates a PIN code. The print information generation unit 14 generates print information corresponding to the print request mail.

The print information includes, for example, print data, data pertaining to a print job of the print data, the user name, and/or the PIN code.

The response mail generation unit 15 generates an electronic mail in response to the print request mail (hereinafter also referred to as "response mail"). The response mail includes, for example, identification data of a print data based on each print data. The response mail may also include, for example, a PIN code corresponding to a print request mail in the case where the PIN code is generated.

The mail reply unit 16 transmits the response mail to the transmission source address of the print request mail. The print information transmission unit 17 stores the print information in the storage server 60 by transmitting the print information to the storage server 60.

The guest data storage unit 19 stores data pertaining to a guest user. A guest user is a user that initially have authorization to use the printing system 1 but is allowed to use the printing system 1 as an exception.

The authentication server 50 includes, for example, a request response unit 51 and a user data storage unit 52. The user data storage unit 52 stores user data with respect to each regular user. The request response unit 51 performs various processes in response to, for example, an authentication request, a request for confirming existence of a mail address, and a request for obtaining a user name corresponding to a mail address.

It is to be noted that the functions of the request response unit 51 are implemented by the processes executed by the CPU of the authentication server 50 in accordance with the program installed in the authentication server 50. The functions of the user data storage unit 52 are implemented by using, for example, an auxiliary storage device of the authentication server 50 or a storage device connected to the authentication server 50 via a network.

The storage server 60 includes, for example, a print information reception unit 61, a print information storage unit 62, and a print information providing unit 63. The print information reception unit 61 receives print information transmitted from the management server 10, and stores (saves) the print information in the print information storage unit 62. The print information providing unit 63 transmits (returns) print information stored (saved) in the print information storage unit 62 to the image forming apparatus 20 in response to a request to obtain print information from the image forming apparatus 20. The print information transmitted to the image forming apparatus 20 is print information that includes a user name or a pin code designated in the print information obtain request.

It is to be noted that the functions of the print information reception unit 61 and the print information providing unit 63 are implemented by the processes executed by the CPU of the storage server 60 in accordance with one or more programs installed in the storage server 60. The functions of the print information storage unit 62 are implemented by using, for example, an auxiliary storage device of the storage server 60 or a storage device connected to the storage server 60 via a network.

The image forming apparatus 20 includes, for example, an authentication control unit 221, a print information obtaining unit 222, and a print control unit 223. The functions of each of these units are implemented by the processes executed by the CPU 211 in accordance with one or more programs installed in the image forming apparatus 20. The authentication control unit 221 accepts a user name and a password input from the user. Alternatively, the authentication control unit 221 may also accept a PIN code input from the user. In a case where a user name and a password are input, the authentication control unit 221 requests the authentication server 50 to authenticate the input user name and password. The print information obtaining unit 222 transmits a request to obtain print information to the storage server 60. The request to obtain print information includes at least a user name or a PIN code designated (accepted) by way of the authentication control unit 221. The print control unit 223 performs a printing process on print data obtained by the print information obtaining unit.

Figure 5:
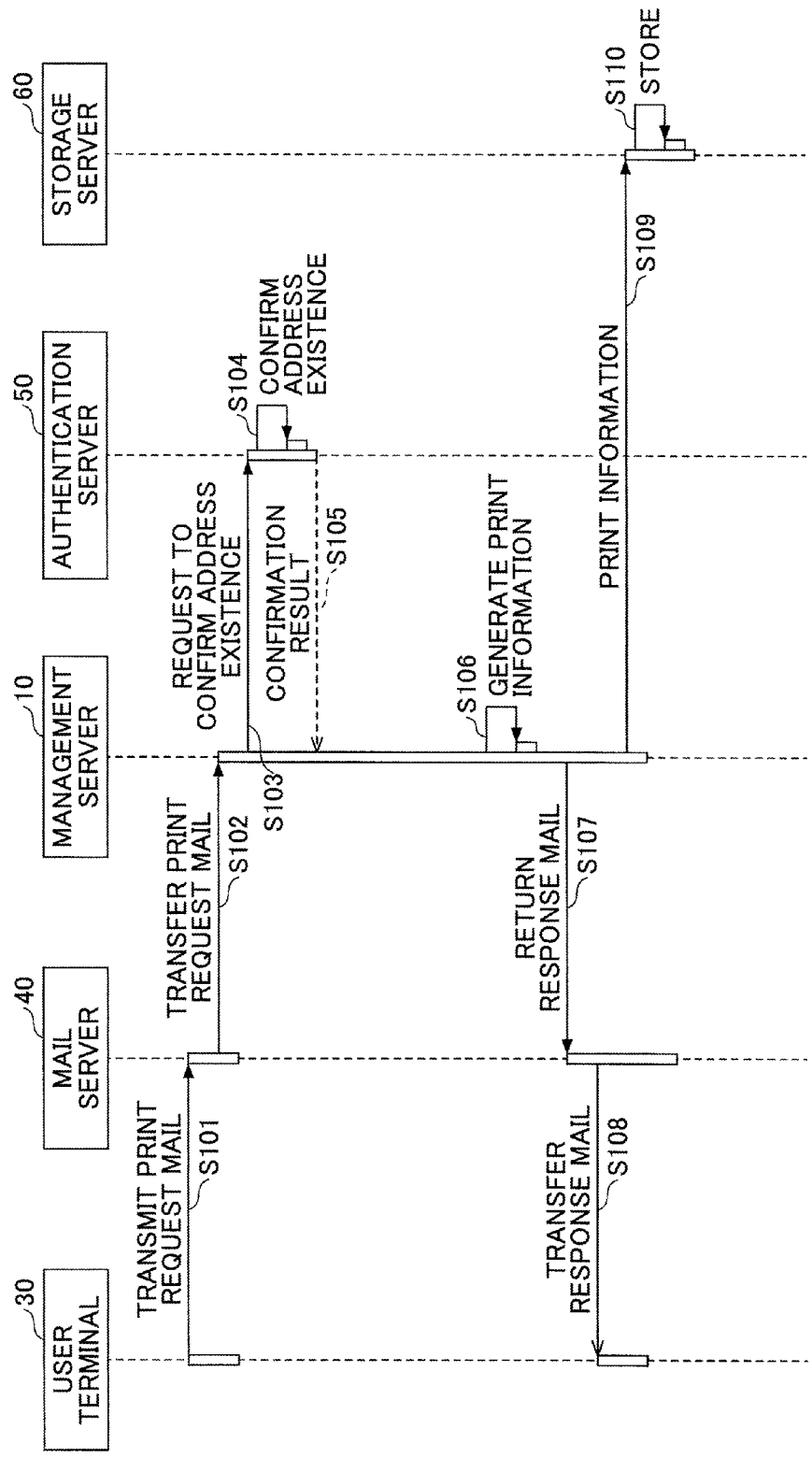
FIG. 5 is a sequence diagram for describing a sequence of processes for storing print data according to the first embodiment of the present invention.

Next, processes performed in the printing system 1 according to the first embodiment of the present invention are described. FIG. 5 is a sequence diagram for describing a sequence of processes for storing print data according to the first embodiment of the present invention.

In Step S101, the user terminal 30 transmits a print request mail to a predetermined mail address in response to an instruction input by the user. Electronic data that is to be printed (target print data) is attached to the print request mail. The predetermined mail address is, for example, a mail address designated beforehand as a mail address of the management server 10.

The mail server 40 transfers the print request mail to the management server 10 according to a typical communication protocol used for transferring electronic mail (Step S102).

The print request mail is received by a mail reception unit 11 of the management server 10. In response to the print request mail, the management server 10 designates a transmission source address of the print request mail and transmits a request to confirm the existence of the designated address (existence confirmation request) (Step S103). In response to the existence confirmation request, the request response unit 51 of the authentication server 50 determines whether the designated address is stored in the user data storage unit 52 to confirm existence of the designated address (Step S104).

FIG. 6 is a schematic diagram illustrating a configuration of the user data storage unit 52 according to an embodiment of the present invention. In FIG. 6, the user data storage unit 52 stores user data in correspondence with each regular user. The user data includes, for example, a user name, a password, and a mail address. Multiple mail addresses (e.g., PC address, mobile phone address) may be registered with respect to a single user.

In Step S104, the request response unit 51 determines whether the mail address designated in the existence confirmation request is included in the mail addresses of the user information stored in the user data storage unit 52.

Then, the request response unit 51 transmits (returns) a response including a confirmation result to the management server 10 (Step S105). The confirmation result is information indicating the existence of the designated mail address.

In response to the received confirmation result, the management server 10 generates print information pertaining to the print request mail (Step S106). Then, the mail reply unit 16 of the management server 10 transmits a response mail in reply to the print request mail to the transmission source address of the print request mail (Step S107). The mail server 40 transfers the response mail to the user terminal 30 of the transmission source of the print request mail (Step S108). It is to be noted that the response mail is generated in the process of generating the print information.

After the response mail is transmitted, the print information transmission unit 17 of the management server 10 transmits print information to the storage server 60 (Step S109). The print information transmitted to the storage server 60 includes, for example, print data generated in the print information generation process and other data associated to the print data.

When the print information reception unit 61 of the storage server 60 receives the print information from the management server 10, the print information storage unit 62 stores the received print information therein (Step S110).

FIG. 7 is a schematic diagram illustrating a configuration of the print information storage unit 62 according to the first embodiment of the present invention. The print information storage unit 62 illustrated in FIG. 7 stores print information with respect to each print data. The print information includes, for example, job names, user mode, print data, user names, and PIN codes.

The "job name" is identification data that corresponds to each print data or each print job executed for each print data. The "user mode" is data indicating whether the transmission source address of the print request mail is being managed in the user data storage unit 52. In this embodiment, the user mode indicates whether the user of the source of the print request is a regular user or a guest user. In FIG. 7, the letter "U" indicates a regular user and the letter "G" indicates a guest user. The "user name" indicates the name of the user that is responsible for a print job based on the print information. The user responsible for a print job is, for example, a user that is to pay for the costs incurred by a print job. It is, however, to be noted that a division of the user's company or the like may attend to the actual payment of the costs incurred by the print job). The "PIN code" indicates a PIN code assigned to the user in a case where the user is a guest user.

Figure 8:
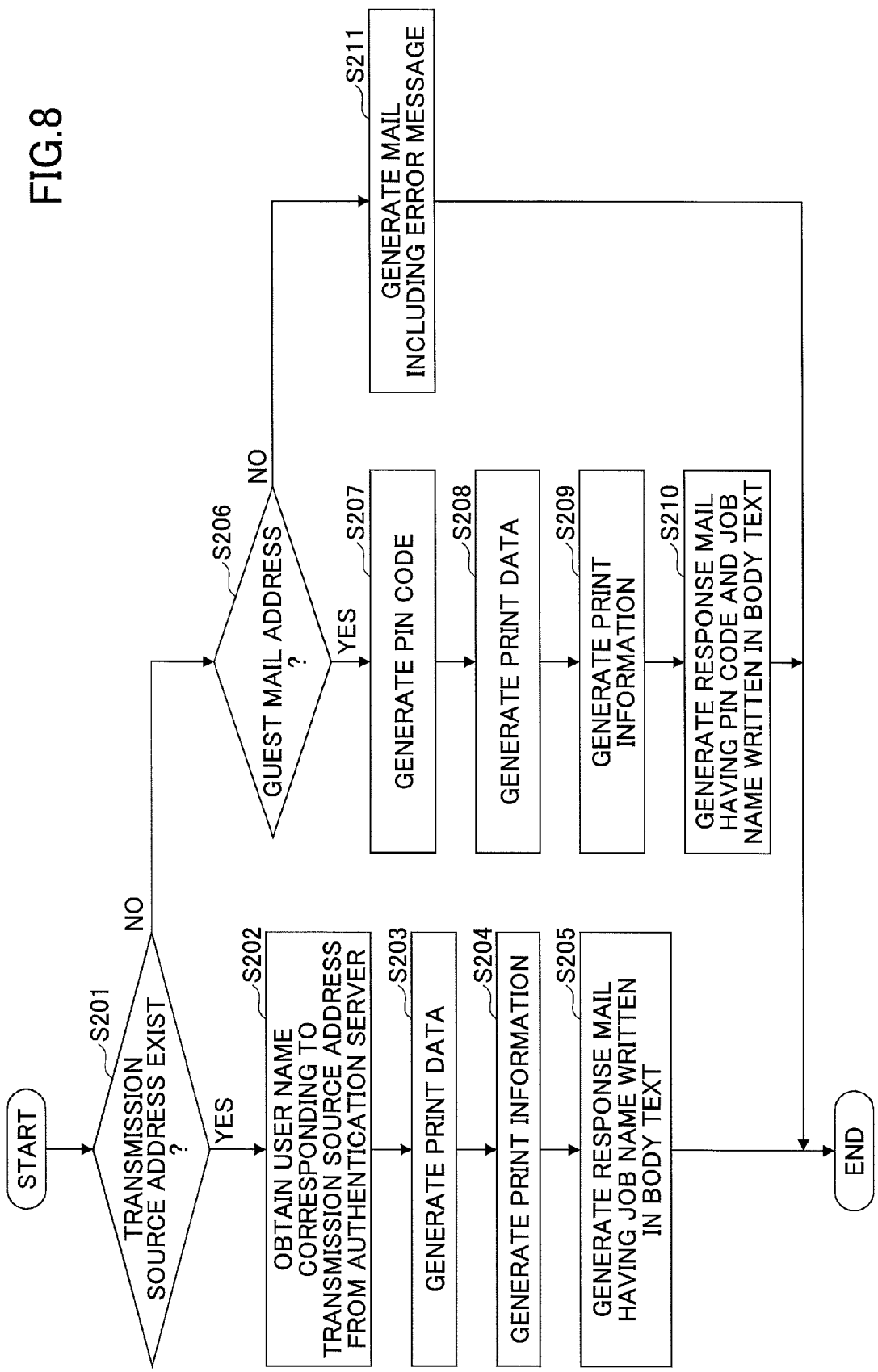
FIG. 8 is a flowchart for describing a sequence of processes for generating print information according to the first embodiment of the present invention.

Next, Step S106 is described in further detail below. FIG. 8 is a flowchart for describing a sequence of processes for generating print information according to the first embodiment of the present invention.

In a case where the confirmation result received in Step S105 of FIG. 5 indicates the existence of the transmission source address of the print request mail (Yes in Step S201), the address confirmation unit 12 obtains the user name corresponding to the transmission source address from the authentication server 50 (Step S202). That is, a user name corresponding to the transmission source address is obtained from the user data storage unit 52.

Then, the print information generation unit 14 generates print data of the body text of the print request mail and print data of the electronic data attached to the print request mail (target print data) (Step S203). Alternatively, the target print data may be generated only from the electronic data attached to the print request mail. Further, in a case where the electronic data attached to the print request mail includes multiple files and is compressed with an archive file format such as a zip format, the print data generation unit 14 uncompresses the electronic data and generates print data in correspondence with each uncompressed file. Therefore, multiple print data (print jobs) may be generated from a single print request mail.

Then, the print information generation unit 14 generates print information for each print data (Step S204). That is, the print information generation unit 14 generates print information including a job name generated in correspondence with each print data. The letter "U" is set to the user mode in each print information. Further, the user name obtained in Step S202 is set with respect to each print information. The print information generated by the print information generation unit 14 is transmitted to the storage server 60 in Step S109 of FIG. 5.

Then, the response mail generation unit 15 generates, for example, a response mail that includes a body text in which a job name of a corresponding print information is written (Step S205). In Steps S107 and S108, the response mail is transferred to the user terminal 30 of the transmission source of the print request mail. The user that has received and browsed the response mail can identify the job name corresponding to each print data generated in correspondence with the print request mail transmitted from the user. It is, however, to be noted that the responses mail does not necessarily need to be transmitted to the user in a case where the transmission source address exists in the user data storage unit 52. This is because the user can recognize the content of print data corresponding to each job name during the below-described procedure of operating on the image forming apparatus 20 in a case where job names are generated based on file names or the like of electronic data.

In a case where the confirmation result received in Step S105 of FIG. 5 indicates that the transmission source address of the print request mail does not exist (No in Step S201), the address confirmation unit 12 determines whether the transmission source address is a mail address of a guest user (Step S206). The determination is performed by referring to the guest data storage unit 19.

FIG. 9 is a schematic diagram illustrating a configuration of a guest data storage unit 19 according to an embodiment of the present invention. The guest data storage unit 19 stores data in correspondence with each guest. For example, a guest mail address (mail address to be used by a guest), a regular user name, a management code, and a PIN code in correspondence with each guest.

The guest mail address is a mail address of a transmission source that is used when the guest user transmits a print request mail. That is, the guest mail address is a mail address that is different from the mail address stored in the user data storage unit 52. The regular user name is, for example, a user name of a user responsible for a print job to be performed for a guest user. The management code is, for example, identification data indicating a regular user's division (department) of a company to be charged for the costs incurred by the print job of the guest user. The PIN code is a code generated for a guest user in the below-described Step S208. Therefore, in a case of a guest user that has never transmitted any print request mail in the past, there is no registered PIN code corresponding to the guest user.

Each of the records of the guest data storage unit 19 corresponding to "guest mail address", "regular user name", and "management code" may be registered by a single user (e.g., administrator). Alternatively, a regular user may register the records that are associated with the regular user name. For example, in a case where records associated with the regular user name are registered by the regular user, the regular user logs in to the management server 10. The management server 10 may automatically register a user name of the regular user that has logged in to the management server 10 in association with a regular user name corresponding to the records to be registered to the guest data storage unit 19 by the regular user. By the automatic registration, each regular user can avoid the possibility of being associated to an unintended guest user mail address.

In Step S206, it is determined whether a transmission source address of the print request mail is registered as a guest mail address among the records of the guest data storage unit 19.

In a case where the transmission source address is stored as a guest mail address in the guest data storage unit 19 (Yes in Step S206), the PIN code generation unit 13 generates a PIN code (S207). In the following, the guest user having its transmission source address registered as a guest mail in the guest data storage unit 19 is referred to as "target guest user". The PIN code generation unit 13 stores the generated PIN code in correspondence with the transmission source address of the print request mail.

It is, however, to be noted that a PIN code need not be newly generated in a case where a PIN code is already stored in the guest data storage unit 19. In this case, the stored PIN code need only be obtained from the guest data storage unit 19. Further, the PIN code may be generated by using any method as long as the generated PIN code does not overlap with another guest user's PIN code stored in the guest data storage unit 19. It is, however, preferable for the PIN code to be constituted of letters that can be easily input by way of the operation panel 25 of the image forming apparatus 20 or a software keyboard displayed on the operation panel 25 of the image forming apparatus 20.

Then, in Step S208, the print information generation unit 14 generates print data of a body text of the print request mail and print data of electronic data attached to the print request mail (target print data). The process performed in Step S208 may be the same as the process performed in Step S203.

Then, the print information generation unit 14 generates print information for each print data (Step S209). That is, the print information generation unit 14 generates print information including a job name generated in correspondence with each print data. The letter "G" is set to the user mode in each print information. Further, the regular user name stored in correspondence with the transmission source of the print request mail in the guest data storage unit 19 is set with respect to each print information. Further, the PIN code generated in Step S207 is also set with respect to each print information. The print information generated by the print information generation unit 14 is transmitted to the storage server 60 in Step S109 of FIG. 5.

Then, the response mail generation unit 15 generates, for example, a response mail that includes a body text in which a job name and a PIN code of a corresponding print information is written (Step S210). In Steps S107 and S108 of FIG. 5, the response mail is transferred to the user terminal 30 of the transmission source of the print request mail. The user that has received and browsed the response mail can identify the PIN code that is required to be input to the image forming apparatus 20 when printing the print data generated in response to the print request mail. Further, the user can also identify the job name corresponding to each print data. It is, however, to be noted that the job name does not necessarily need to be included in the response mail.

It is to be noted that the response mail transmitted in Step S210 may also be transmitted to the regular user associated with the guest user having a destination address to which the response mail is transmitted in Step S210. The user name of the regular user can be identified based on the guest data storage unit 19. The mail address corresponding to the user name of the regular user can be identified based on the user data storage unit 52. By transmitting the response mail to the regular user in addition to the guest user in response to the print request mail from the guest user, the regular user can detects a print job that is registered with the regular user's name. Thereby, the regular user can detect fraudulent registration of an unintended print job.

It is to be noted that, in a case where the transmission source address of the print request mail is stored in neither of the user data storage unit 52 and the guest data storage unit 19 (No in Step S206), the response mail generation unit 15 generates, for example, a response mail including an error message (hereinafter also referred to as "error mail") (Step S211). In this case, the error mail is transmitted (returned) in response to the print request mail in Step S110. Further, in this case, the print information generation part 14 does not generate any print information. Therefore, Steps S112 and S113 of FIG. 5 are not executed. That is, the user is unable to print with the image forming apparatus 20.

It is to be noted that the mail address used as the transmission source address of the print request mail may be registered as the guest mail address to be stored in the guest data storage unit 19. In this case, it is determined whether the transmission source address of the print request mail is stored as a guest mail address among the records of the guest data storage unit 19 in Step S206.

In a case of storing the mail address of the transmission source as the guest mail address in the guest data storage unit 19, the mail address of the guest user is, in principle, registered beforehand. Then, the guest user transmits a print request mail having the guest user's mail address as the transmission source of the print request mail. This ensures uniqueness in which a single guest user can be identified by a single PIN code. Further, there is also an advantage of being able to use the same PIN code for transmitting print request mail with the same mail address (except for a case where multiple users are able to use a single mail address). It is, however, necessary to register personal information of the guest user such as a mail address in correspondence with each guest user.

On the other hand, in a case where the guest mail address stored in the guest data storage unit 19 is set as the mail address of a transmission destination, one or more guest addresses are, in principle, distributed to and registered in correspondence with a single regular user. Then, in a case where there is, for example, a visit of a guest, the regular user can teach the guest address to the guest, so that the guest can transmit a print request mail having the guest address as its transmission destination (destination address). Thereby, there is no need to register guest mail addresses equivalent to the number of guests that desire to transmit a print request mail, and no need to register the mail addresses of the guest users. However, in a case where a PIN code corresponding to a guest mail address is shared by multiple guest users, print data of another guest user may be unintentionally printed in a case where multiple guest users use the same single guest mail address (e.g., in a case where there are multiple visitors). Therefore, in this case, a unique PIN code corresponding to a single print request mail is to be generated or a unique PIN code corresponding to a transmission source address is to be generated and managed.

The mail address to be used as the guest mail address may be decided depending on how a company or user operates. It is preferable to manage the guest mail addresses of each record of the guest data storage unit 19 by associating the guest mail addresses with identification data that indicate whether a guest mail address is a transmission source address or a transmission destination address. Thereby, the degree of freedom of the determination in Step S206 can be increased determining whether a transmission source address or a transmission destination address is a mail address of the guest user based on identification data.

Then, in a case where the user receives a response mail other than an error mail, the user goes to the area where the image forming apparatus 20 is installed (placed) and operates the image forming apparatus 20. Next, a procedure of processes performed by the image forming apparatus 20 in response to the operation of the user is described.

Figure 10:
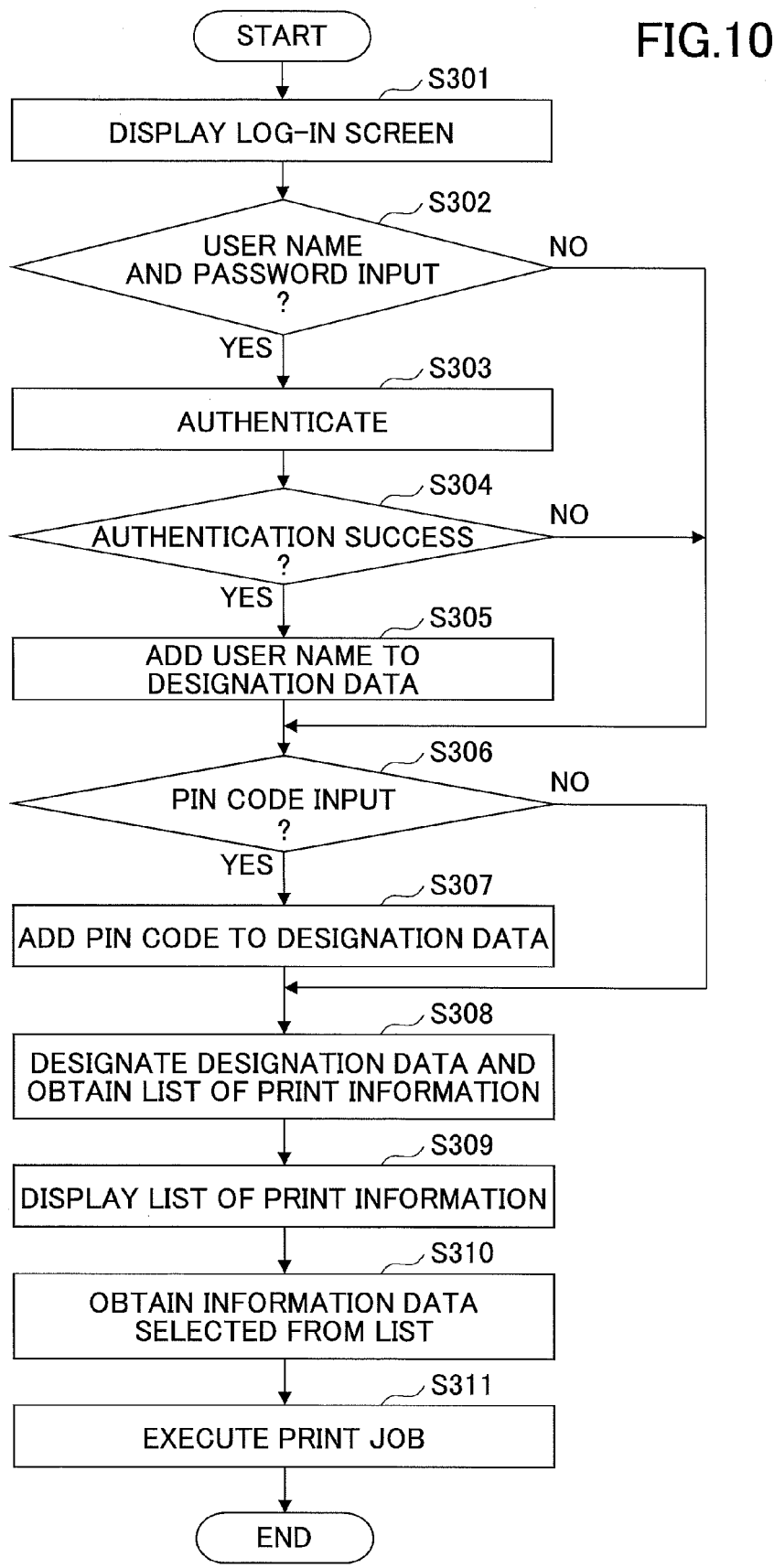
FIG. 10 is a flowchart illustrating a procedure of processes performed by an image forming apparatus according to an embodiment of the present invention.

FIG. 10 is a flowchart illustrating a procedure of processes performed by the image forming apparatus 20 according to an embodiment of the present invention.

For example, in response to a call for a printing function for printing print data stored in the storage server 60, the authentication control unit 221 displays a log-in screen on the operation panel 25 (Step S301).

Figure 11:
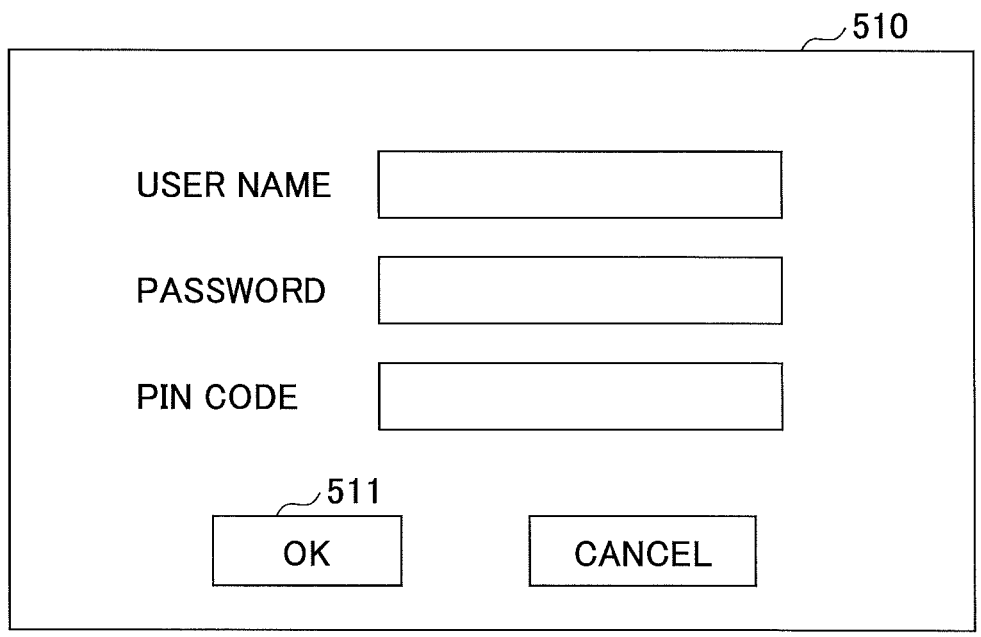
FIG. 11 is a schematic diagram illustrating an example of a log-in screen 510 displayed on the operation panel 25 according to an embodiment of the present invention.

FIG. 11 is a schematic diagram illustrating an example of a log-in screen 510 displayed on the operation panel 25 according to an embodiment of the present invention. In FIG. 11, the log-in screen 51 includes input areas for inputting, for example, a user name, a password, and a PIN code.

In a case where the operator of the image forming apparatus 20 is a regular user, a user name and a password are input to the log-in screen 510. On the other hand, in a case where the operator of the image forming apparatus 20 is a guest user, a PIN code, which is reported (notified) to the guest user by way of a response mail, is input to the log-in screen 510

It is to be noted that the PIN code may be input even in a case where the operator of the image forming apparatus 20 is a regular user. For example, in a case where the regular user transmits a print request mail from a mail address that is not stored in the user data storage unit 52 (e.g., a case where the regular user transmits a print request mail from a mail address of a user terminal 30 personally used by the regular user), a response mail transmitted to the user terminal 30 in response to the print request mail includes a PIN code. On the other hand, there is also a case where the regular user transmits a print request mail from another mail address that is stored in user data storage unit 52. In this case, both print data associated with the PIN code and print data associated with the user name of the regular user are stored with respect to the regular user in the storage server 60. In order to enable printing of both print data by a single log-in operation, the PIN code may also be input at the same time of inputting the user name and the password of the regular user.

When at least one of a user name, a password, and a PIN code is input to the log-in screen 510, and the OK button 511 is pressed, the authentication control unit 221 determines whether a user name or a password is input to the log-in screen 510 (Step S302). In a case where the user name and the password are input (Yes in Step S302), the authentication control unit 221 performs an authentication process (S303). More specifically, the authentication control unit 221 transmits an authentication request including a designated user name and password to the authentication server 50. The request response unit 51 of the authentication server 50 determines whether a set of the designated user name and the password included in the authentication request is stored in the user data storage unit 52. In a case where the set is stored in the user data storage unit 52, the authentication process is a success. In a case where the set is not stored in the user data storage unit 52, the authentication process is a failure. The request response unit 51 transmits data indicating success/failure of the authentication process to the authentication control part 221 of the image forming apparatus in response to the authentication request transmitted from the authentication control part 221.

In a case where the authentication process is a success (Yes in Step S304), the print information obtaining unit 222 add the user name input to the log-in screen 510 to designation data (Step S305). It is to be noted that "designation data" is data that is designated in the below-described Step S308 for obtaining a list of print information from the storage server 60. In a case where the authentication process is a failure (No in Step S304), Step S305 is not performed.

In a case where a user name and a password are not input to the log-in screen 510 (No in Step S302), a case where authentication based on the input user name and password is a failure (No in Step S304), or a case where the process of Step S305 is completed, the print information obtaining unit 222 determines whether a PIN code is input to the log-in screen 510 (Step S306). In a case where a PIN code is input (Yes in Step S306), the print information obtaining unit 222 adds the PIN code to designation data (S307). In a case where a PIN code is not input (No in Step S306), Step S307 is not performed.

Then, the print information obtaining unit 222 designates designation data and obtains a list of print information from the storage server 60 (Step S308). More specifically, the print information obtaining unit 222 designates designation data and transmits a request to obtain a list of print information including the designated designation data to the storage server 60. In response to the request from the print information obtaining unit 222, the print information providing unit 63 of the storage server 60 obtains print information including the designated designation data from the print information storage unit 62 (see FIG. 7). That is, in a case where a user name and a password are input to the log-in screen 510, the obtained print information includes a user mode indicated as "U" and a user name matching the input user name. In a case where a PIN code is input to the log-in screen 510, the obtained print information includes a user mode indicates as "G" and a PIN code matching the input PIN code. It is to be noted that print information obtained in response to a print request mail from a guest user includes a user name of a regular user (regular user name) associated with the guest user. Therefore, in a case where a user name and a password are input to the log-in screen 510, there is a case where the obtained print information includes a user mode indicated as "G" and a user name matching the input user name. As a result, the regular user can instruct the image forming apparatus 20 to perform a printing process on a print job based on a print request mail transmitted from a guest user. Thus, for example, even in a case where the image forming apparatus 20 is installed in an area restricting entry of a guest user, the regular user can substitute for the guest user for instructing a print job. However, even in the case where a user name and a password are input to the log-in screen 510, it is possible to prohibit obtaining of print information including a user mode indicated as "G" and the user name matching an input user name if there is a priority for protecting confidential data included in a print request mail transmitted from a guest user.

If the authentication process is a success in a case where both the set of user name/password and the PIN code are input to the log-in screen 510, both print information including a user mode "U" and the input user name and print information including a user mode "G" and the input PIN code are obtained. If the authentication process is a failure in a case where both the set of user name/password and the PIN code are input to the log-in screen 510, print information including a user mode "G" and the input PIN code is obtained.

The print information providing unit 63 transmits a list of the obtained print information to the image forming apparatus 20. It is to be noted that the transmitted print information does not need to contain print data.

Then, the print information obtaining unit 222 of the image forming apparatus 20 displays, for example, a list of print jobs included in the transmitted print information on the operation panel (Step S309). The list includes candidates of data to be printed (target print data). That is, the user can input an instruction for performing a printing process based on the print information included in the list.

When one or more print jobs is selected from the list, the print information obtaining unit 222 obtains print data corresponding to the one or more selected print jobs from the storage server 60 (Step S310). More particularly, the print information obtaining unit 222 transmits a request to obtain print data corresponding to a designated print job to the storage server 60. In response to the request, the print information providing unit 63 of the storage server 60 transmits print data corresponding to the designated print job included in the request to the image forming apparatus 20. The print information corresponding to the designated print job may also be hereinafter referred to as "target print information".

In a case where print information corresponding to a single print data is obtained according to the input user name or PIN code, it is possible for the print information obtaining unit 222 obtain print data without performing the process of Step S309. Further, the print information providing unit 63 may transmit information data obtained according to the input user name or PIN code to the image forming apparatus 20 instead of transmitting the list of print information to the image forming apparatus 20.

Then, the print control unit 223 controls execution of a print job pertaining to the print data (Step S311). As a result, a sheet having the print data printed thereon is output. A log indicating the execution of the print job may include a user name included in the target print information. In this embodiment, a user name is included even in a case where the user mode of the print information is indicated as "G". That is, in this embodiment, the user name is included in both print information including the user mode "U" and print information including user mode "G". Thus, for example, in a case where a billing destination that is to be billed (i.e. entity for payment) for the cost incurred by a print job is determined based on the user name, the billing destination for the payment can be determined even for a print job indicated with a user mode "G". It is to be noted that identification data of the billing destination and a corresponding user name may be stored in, for example, the HDD 214.

In Step S311, if the target print information is indicated with a user mode "U" (i.e. a case where the operator of the image forming apparatus 20 is a regular user), the print control unit 223 executes the print job within the range of authority (print authority) corresponding to the user name input during the log-in operation. On the other hand, if the target print information is indicated with a user mode "G" (i.e. a case where the operator of the image forming apparatus 20 is a guest user), the print control unit 223 executes the print job within the range of authority of the regular user associated with the guest user. Alternatively, the print job may be executed within a range of authority corresponding to the guest user. It is to be noted that the authority of each user may be stored in the guest data storage unit 19. The authority of guest user may be shared by multiple guest users or different from one another.

According to the above-described first embodiment, even in a case where a guest user does not have its account (e.g., user name, password) registered in the authentication server 50, a print authority may be granted to the guest user. Therefore, the necessity for the guest user to request the regular user to print data can be reduced. Further, a PIN code is reported (notified) to a guest user in response to each print request mail from the guest user. Therefore, a virtual temporary account can be provided to each guest user. Thus, print data that can be operated by each of the guest users is limited to print data corresponding to a print request mail from each of the guest users. This prevents print data of a guest user from being easily operated by other guest users.

Further, the necessity for installing an image forming apparatus 20 dedicated to be used by a guest user is reduced.

Further, in a case where a guest user is permitted to use the printing system 1 as an exception, the guest user may be stored in the guest data storage unit 19 in correspondence with one of the regular users beforehand. As a result, a regular user can be associated with respect to a print job requested by the guest user. Further, the billing destination that is to pay for the cost incurred by the print job can be determined based on the association between the guest user and the corresponding regular user.

Further, even in a case where the user is a regular user, the regular user may transmit a print request mail from a mail address that is different from a mail address stored in correspondence with the regular user. However, in this case, the regular user can be prevented from being mistaken for a guest user. That is, as long as a mail address designated as a transmission source address of a print request mail is stored as a guest mail address in correspondence with a name of a regular user in the guest data storage unit 19, execution of a print job can be permitted in accordance with the print request mail. Further, the billing destination of the cost incurred by the print job can be determined in accordance with the print request mail.

In a case where multiple print request mails are transmitted from the same guest user, multiple response mails having respective PIN codes are transmitted to the user terminal 30 of the guest user. Considering this situation, the log-in screen 510 may be displayed to enable input of multiple PIN codes. The print information obtaining unit 222 may obtain print information including any one of the multiple PIN codes from the storage server 60. By doing so, a complicated process of having to repeat a log-in operation or displaying of the list of print information with respect to each of the multiple PIN codes can be prevented.

Further, the PIN code generation unit 13 of the management server 10 may store a generated PIN code in correspondence with a transmission source address of a print request mail in, for example, the auxiliary storage apparatus 102. In such case where a PIN code is stored in correspondence with a transmission source address of a print request mail in the auxiliary storage apparatus 102, the PIN code generation unit 13 may output the stored PIN code without having to generate a new PIN code. In this case, a response mail including the stored PIN code is transmitted in response to the print request mail.

Thereby, in a case where multiple print request mails are transmitted from the same guest user, a single PIN code is assigned with respect to the guest user instead of assigning a PIN code to each print request mail.

Accordingly, the guest user can instruct the image forming apparatus 20 to display a list of print information corresponding to the multiple print request mails or print the print information by inputting the PIN code to the log-in screen 510.

It is to be noted that the image forming apparatus 20 may set a limitation in a case of printing print data corresponding to print information obtained by designation of a PIN code. For example, the limitation may be, for example, an upper limit in the number of sheets that can be printed or a limitation preventing the performing of a color printing process. By doing so, the guest user is prevented from performing a large amount of printing.

Further, a validity date may be set to a PIN code. Thus, a PIN code having an expired validity date may be invalidated.

Next, a second embodiment of the present invention is described. In the following second embodiment, aspects that are different from the first embodiment are described. Therefore, aspects that are not mentioned in the second embodiment may be substantially the same as the above-described aspects of the first embodiment.

The second embodiment is explained with an example in which the functions of the management server 10, the authentication server 50, and the storage server 60 are provided by way of the Internet similar to that of a cloud service. Therefore, in the second embodiment, the Internet is provided between the user terminal 30, the mail server 40, and the management server 10, and between the image forming apparatus 20, the authentication server 50, and the storage server 60.

Figure 12:
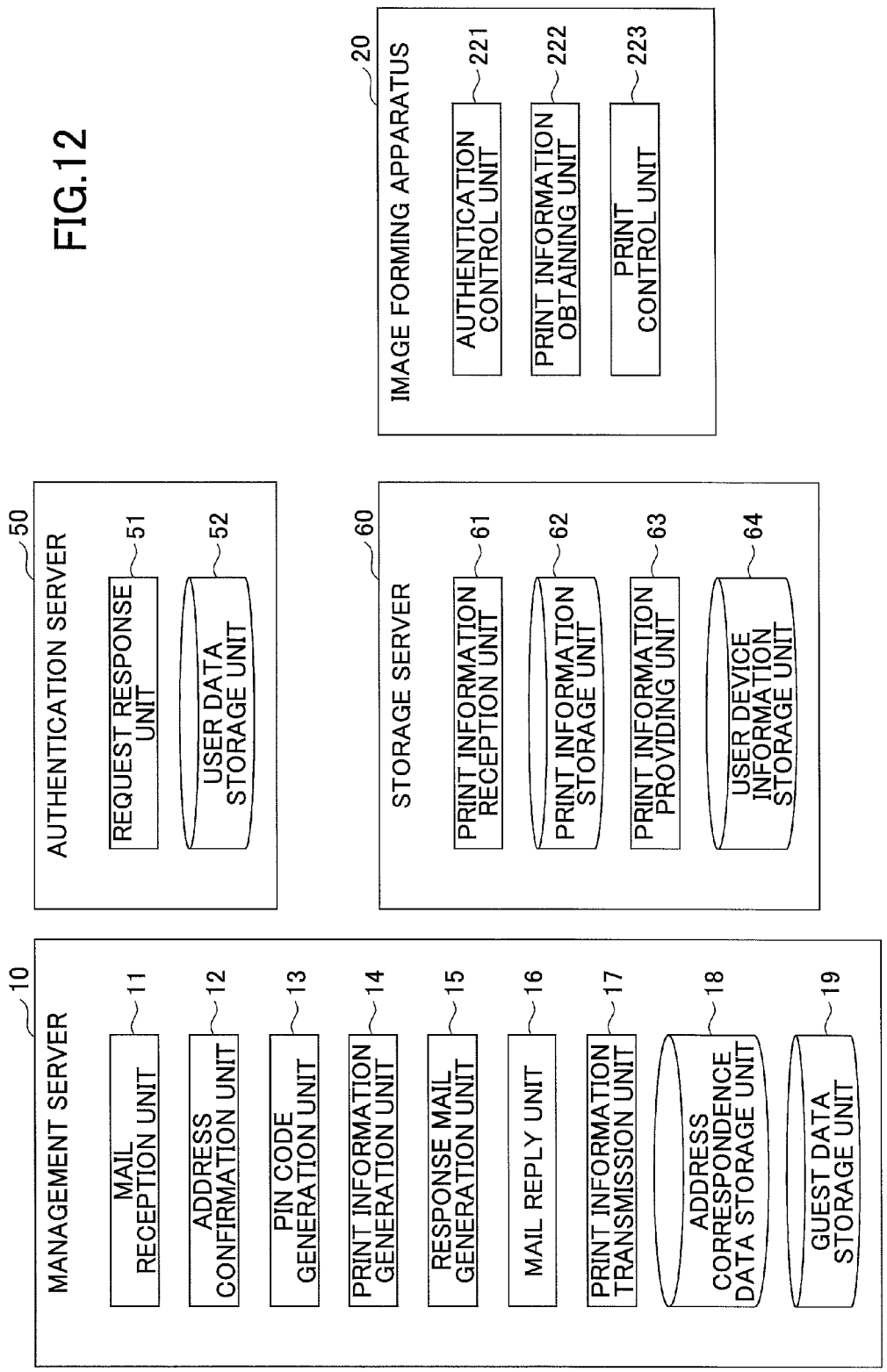
FIG. 12 is a schematic diagram illustrating a configuration of functions of the printing system 1 according to the second embodiment of the present invention.

FIG. 12 is a schematic diagram illustrating a configuration of functions of the printing system 1 according to the second embodiment of the present invention. In the second embodiment, the management server 10 includes an address correspondence data storage unit 18. The address correspondence data storage unit 18 stores mail addresses that are assigned to each user company (company serving as a user) and addressed to the management server 10. The address correspondence data storage unit 18 is implemented by using, for example, the auxiliary storage apparatus 102 or a storage device connected to the management server 10 via a network.

Further, the storage server 60 includes a user device information storage unit 64. The user device information storage unit 64 stores identification data (hereinafter also referred to as "device ID") of each image forming apparatus 20 installed in correspondence with each user company.

The sequence of processes for storing print data according to the second embodiment is substantially the same as the sequence illustrated in FIG. 5. However, a part of the steps of the sequence of the second embodiment is different from the steps of the sequence of the first embodiment. More specifically, in Step S101, the user terminal 30 designates a predetermined mail address of the management server 10 and transmits a print request mail to the predetermined mail address of the management server 10. In this embodiment, the predetermined mail address of the management server 10 is assigned to each user company to which a target image forming apparatus 20 belongs (i.e. image forming apparatus that is to perform printing). That is, the predetermined mail address of the management server 10 is assigned to each user company at which the target image forming 20 is installed.

The mail reception unit 11 of the management server 10 determines which user company's image forming apparatus 20 is designated to be the target image forming apparatus 20 based on the mail address in which the print request mail has been received. That is, the mail reception unit 11 determines the target image forming apparatus 20 based on the mail address designated to be the destination of the print request mail. The determination is performed by using the address correspondence data storage unit 18.

FIG. 13 is a schematic diagram illustrating a configuration of the address correspondence data storage unit 18 according to an embodiment of the present invention. The address correspondence data storage unit 18 stores, for example, company codes and reception addresses in correspondence with each user company.

The company code is an identification data assigned to each user company. The reception address is a mail address destined for the management server 10 and is assigned to each user company. From the standpoint of the management server 10, the reception address is a mail address or a part of a mail address for receiving a print request mail from a corresponding user company.

The mail reception unit 11 stores a company code corresponding to a mail address that has received a print request mail. The company code is stored in, for example, the memory apparatus 103. Accordingly, in Step S109, print information including a company code is transmitted to the storage server 60. When the print information reception unit 61 of the storage server 60 receives the print information from the management server 10, the print information storage unit 62 stores the received print information therein (Step S110).

FIG. 14 is a schematic diagram illustrating a configuration of a print information storage unit 62 according to the second embodiment of the present invention. As illustrated in FIG. 14, the print information storage unit 62 of the second embodiment also stores company codes in correspondence with each print data. It is to be noted that the print information storage units 62 may be separately provided in correspondence with each company code.

Then, the user that has transmitted the print request mail goes to the area where the image forming apparatus 20 is installed (placed) and operates the image forming apparatus 20. Next, a procedure of processes performed by the image forming apparatus 20 in response to the operation of the user is described.

It is to be noted that, in Step S206 of FIG. 8, the address confirmation unit 12 determines whether a transmission source address of a received print request mail is a guest user mail address by referring to the guest data storage unit 19 to search for a company code corresponding to a mail address matching the transmission source address of the print request mail.

The procedure of processes performed by the image forming apparatus 20 in the second embodiment is basically the same as the procedure of processes illustrated in FIG. 10. However, a part of the steps of the processes of the second embodiment is different from the steps of the processes of the first embodiment. More specifically, in Step S308, the print data obtaining unit 22 designates designation data including a company code and a device ID in addition to other designated data and transmits a request to obtain a list of print information including the designated designation data to the storage server 60. The device ID is a device ID of the image forming apparatus 20 that is to perform printing. The device ID is stored in, for example, the ROM 213, the NVRAM 215, or the HDD 214 of the image forming apparatus 20. The company code is a code of the company at which the image forming apparatus 20 is installed. The company code is set to the image forming apparatus 20 beforehand. The company code that is set to the image forming apparatus 20 may be stored in, for example, the NVRAM 215 or the HDD 214.

It is to be noted that the device ID may be stored in the form of a specific application installed in the image forming apparatus 20. In this case, the image forming apparatus 20 having the specific application installed therein may be identified based on the device ID. That is, in this embodiment, as long as the image forming apparatus 20 can be determined as the image forming apparatus 20 having the specific application installed therein, an identifier or the like of the specific application may be used as the device ID.

The print information providing unit 63 of the storage server 60 determines whether a set of the company code and the device ID included in a designation data of a print information obtain request is stored in the user device data storage unit 64.

FIG. 15 is a schematic diagram illustrating a configuration of the user device data storage unit 64 according to an embodiment of the present invention. As illustrated in FIG. 15, the user device data storage unit 64 associates the company code of the user company with the device ID of the image forming apparatus 20 and stores the associated company code and the device ID in correspondence with each of the image forming apparatuses 20 installed in the user company.

In a case where the set of the company code of the user company and the device ID is not stored in the user device data storage unit 64, the print information providing unit 63 does not transmit a list of print information. This is because the image forming apparatus 20 (transmission source) that has transmitted the request to obtain print information is likely to lack validity. The validity of an image forming apparatus is an indication that the image forming apparatus 20 is installed in an appropriate user company.

In a case where the set of the company code of the user company and the device ID is stored in the user device data storage unit 64, the print information providing unit 63 obtains print information including the designation data in the request to obtain print information from the print information storage unit 62 (see FIG. 14). That is, in the second embodiment, print information, which also includes a company code matching the company code included in the designation data, is obtained from the print information storage unit 62. Then, the print information providing unit 63 transmits a list of the obtained print information to the image forming apparatus 20.

It is to be noted that the company code need not be included in the designation data in the request to obtain a list of print information in a case where there is no need to inspect the validity of the image forming apparatus 20. The print information providing unit 63 may refer to the device ID included in the designation data and identify the company code corresponding to the device ID based on the user device information storage unit 64 and used the identified company code to obtain print information from the print information storage unit 62.

According to the above-described second embodiment, the mail addresses destined for the management server 10 are different for each user company. Further, a company code is identified with respect to a request to obtain a list of print information from the image forming apparatus 20. In response to the request from the image forming apparatus 20, the list of print information including the company code is transmitted to the image forming apparatus 20. Accordingly, even in a case where print request mails are transmitted from users having the same user name from different user companies, print information requested from one company can be prevented from becoming a printing candidate in response to a print request mail from another company.

In a case where a mail address of a transmission source of a print request mail is a mail address of a regular user of one of the user companies, a company code can be identified by managing the mail addresses of regular users in association with company codes. Further, in a case where a mail address of a transmission source of a print request mail is a mail address of a guest user, a company code can be identified based on the mail addresses of regular users associated with guest users. Therefore, mail addresses destined for the management server 10 does not necessarily need to be provided for each user company.

It is to be noted that a mail address of the management server 10 may itself be used as a company code for each user company. In this case, the user device data storage unit 64 need not be provided. In this case, the mail address of the management server 10 is included in print information and stored in the storage server 60. Further, the mail address of the management server 10 is stored beforehand in the image forming apparatus 20. The image forming apparatus 20 transmits a request to obtain a list of print information including a device ID and a designated mail address of the management server 10 to the storage server 60. The storage server 60 transmits a list of print information including the mail address of the management server 60 designated in the request.

Even in these cases, the above-described of the second embodiment can be attained.

Next, a third embodiment of the present invention is described. In the following second embodiment, aspects that are different from the first embodiment are described. Therefore, aspects that are not mentioned in the second embodiment may be substantially the same the above-described aspects of the first and second embodiments.

The third embodiment is explained with an modified example of processes performed during user authentication with the image forming apparatus 20.

In the first embodiment, a user name, a password or a PIN code are input to the log-in screen 510. In this case, the user is to input the user name, the password, or PIN code by using a keyboard or the like. In order to reduce operation load of the user, the image forming apparatus 20 of the third embodiment is provided with a non-contact type card reader. The user terminal 30 used by the user is a portable type terminal including the same IC chip as an IC chip of an IC card. For example, a user name and a password of a user are stored in a storage unit of the user terminal 30. The user terminal 30 includes an application that is to be transmitted to the image forming apparatus 20 via the card reader of the image forming apparatus 20 in a case where the user name and the password are read out from the storage unit of the user terminal 30 when the user terminal 30 is placed over the card reader of the image forming apparatus 20. The authentication control unit 221 of the image forming apparatus 20 performs an authentication process by using the user name and the password received by the card reader.

Even with this configuration of the modified example, authentication of the regular user can be performed by placing the regular user's user terminal 30 over the image forming apparatus 20.

In a case where the user of the user terminal 30 is a guest user, a response mail including a PIN code is transmitted in response to a print request mail transmitted from the user terminal 30. Then, the response mail is stored in a storage unit of the user terminal 30. Accordingly, the above-described application included in the user terminal 30 may be implemented to search for an electronic mail (i.e. response mail) having a predetermined mail address as the transmission source address in the user terminal 30 when the user terminal 30 is placed over the card reader of the image forming apparatus 20. In a case where the electronic mail having a predetermined mail address is found in the user terminal 30, the PIN code included in the electronic mail may be transmitted to the image forming apparatus 20 via the card reader. The print information obtaining unit 222 of the image forming apparatus 20 may designate the PIN code received from the card reader and obtain print information.

With the above-described configuration, the guest user can browse a list of print information associated with a PIN code assigned to the guest user by placing the guest user's user terminal 30 over the image forming apparatus 30.

Further, in a case where a user name, a password, and a PIN code are stored in the user terminal 30, the image forming apparatus 20 may obtain the user name, the password, and the PIN code and obtain print information corresponding to the user name as well as print information corresponding to the PIN code.

It is to be noted that, although the above-described embodiments describe outputting data by printing with the image forming apparatus 20, the present invention is not limited to printing. For example, the present invention may be applied to a case of projecting image data from a projector. That is, the present invention may also be applied to a case where target print data is replaced with target output data that is output by way of displaying with a terminal or projecting with a projector.

Although the above-described embodiments are described with examples where target print data are transmitted by way of electronic mail, the target print data may be transmitted to the management server 10 by using other methods of communications. In this case, the management server 10 receives target print data and data pertaining to a user name of a regular user or target print data and data pertaining to a mail address of a guest user from the user terminal 30. In case where the mail address of the guest user is stored in correspondence with a user name of a regular user in the guest data storage unit 19, the management server 10 generates a PIN code and transmits the generated PIN code to the user terminal 30.

In a case where company codes are managed as described in the second embodiment, the management server 10 receives data pertaining to a company code from the user terminal 30 in addition to receiving target print data along with data pertaining to a user name of a regular user or receiving target print data along with data pertaining to a mail address of a guest user.

Further, in a case where the management server 10 does not receive a company code or a case where the management server 10 is unable to find a company code that matches a received company code, the management server 10 transmits a notice to the user terminal 30 indicating that printing of target print data is denied. In a case where there is a matching company code and a mail address of a guest user is stored in the guest data storage unit 19 in correspondence with a user name of a regular user, the management server 10 generates a PIN code and transmits the generated PIN code to the user terminal 30.

It is to be noted that a single computer may be used to serve as both the management server 10 and the storage server 60 in the above-described embodiments of the present invention. Alternatively, a single computer may be used to serve as the management server 10, the storage server 60, and the authentication server 50. Alternatively, the functions of the management server 10, the storage server 60, and the authentication server 50 may be provided in the image forming apparatus 20.

On the other hand, multiple computers may be used for each of the management server 10, the storage server 60, and the authentication server 50.

Further, although the above-described embodiments are described with an example where print data are generated by the management server 10, the generation of print data pertaining to the electronic data attached to the print request mail may be implemented by one or more of the user terminal 30, the management server 10, the storage server 60, and the image forming apparatus 20.

Next, a fourth embodiment of the present invention is described. The fourth embodiment is a modified example of the second embodiment.

Figure 16:
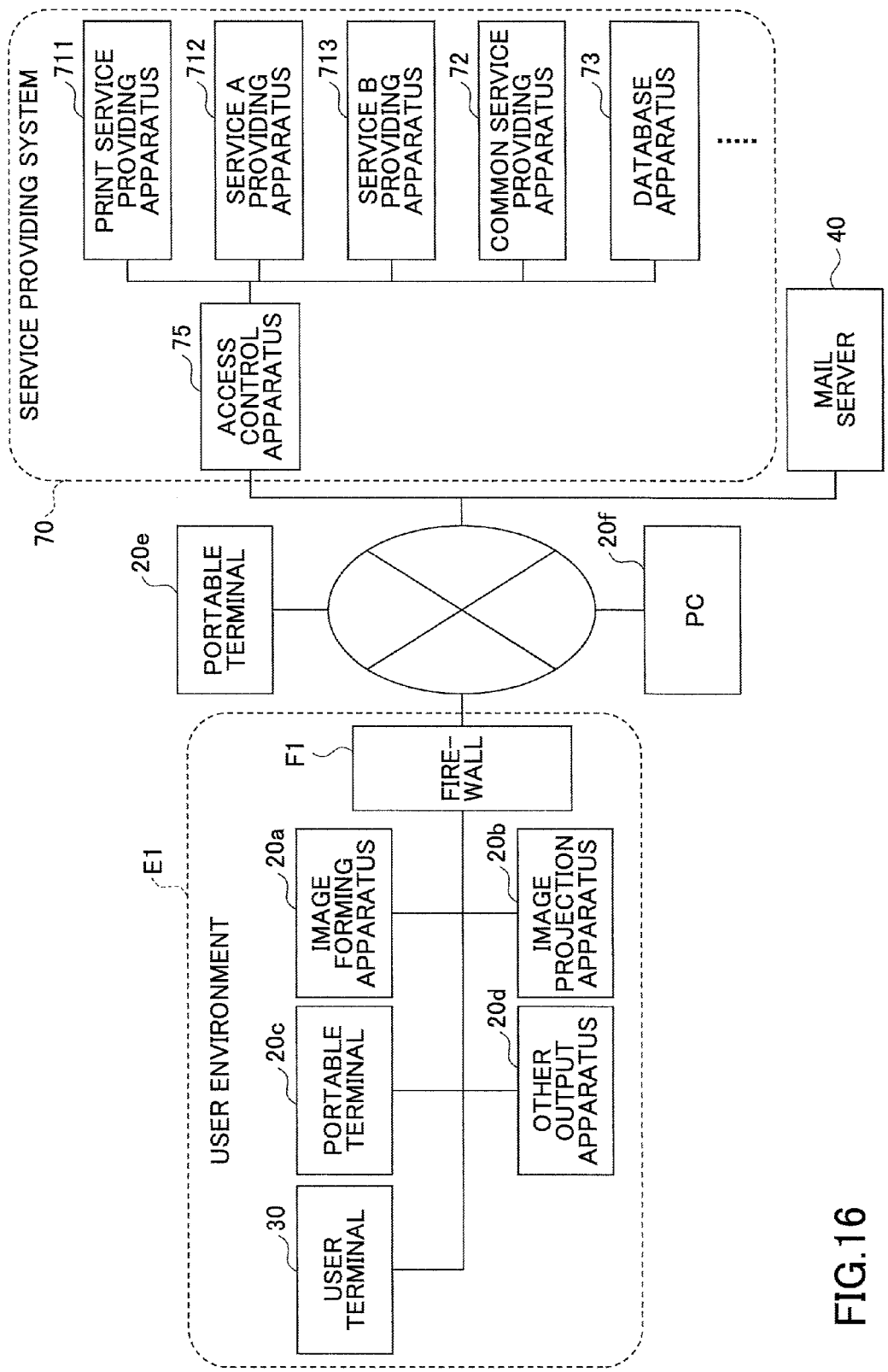
FIG. 16 is a schematic diagram illustrating a configuration of a system according to the fourth embodiment.

FIG. 16 is a schematic diagram illustrating a configuration of a system according to the fourth embodiment. In FIG. 16, like components are denoted with like reference numerals as the reference numerals of FIG. 1 and are not further explained. In FIG. 16, a service providing system 70 and a user environment E1 can communicate with each other via a wide area network such as the Internet.

The service providing system 70 is a computer system that provides a cloud service via a network. It is be noted that, although this embodiment is described using an example of a cloud service, this embodiment may also be applied to various other services provided via a network such as a service provided by a ASP (Application Service Provider) or a Web service.

The service providing system 70 includes, for example, an access control apparatus 75, a print service providing apparatus 711, a service A providing apparatus 712, a service B providing apparatus 713, a common service providing apparatus 72, and a database apparatus 73. Each of the apparatuses included in the service providing system 70 may be implemented by a single computer.

The access control apparatus 75 controls access to computers inside the service providing system 70. The access control apparatus 75 also scatters (decentralizes) the workload of the computer inside the service providing system 70.

The print service providing apparatus 711 includes one or more computers that control the processes for providing a cloud printing service. The cloud printing service is a service that allows print data to be uploaded to a cloud environment (in this embodiment, the service providing system 70) and printed by the image forming apparatus 20 according to necessity.

The service A providing apparatus 712 and the service B providing apparatus 713 are examples of computers that provide services other than the cloud printing service.

The common service providing apparatus 72 includes one or more computers providing functions shared by apparatuses (e.g., print service providing apparatus 711, service A providing apparatus 712, service B providing apparatus 713) that directly provide a particular service via a network. The one or more computers of the common service providing apparatus 72 may also provide functions used by multiple apparatuses.

The database apparatus 73 includes one or more computers or storage devices that function as various storage units.

The user environment E1 is a system environment of an organization (e.g., user company) which is a user of the service providing system 70. The user environment E1 illustrated in FIG. 16 includes, for example, an image forming apparatus 20a, an image projection apparatus 20b, a portable terminal 20c, other output apparatuses 20d, and the user terminal 30. The apparatuses and terminals included in the user environment E1 are connected to each other by a network (wireless or wired) such as LAN (Local Area Network).

The image forming apparatus 20a is substantially the same as the image forming apparatus 20 of the second embodiment.

The image projection apparatus 20b is, for example, a projector that projects image data. The portable terminal 20c is, for example, a PDA (Personal Digital Assistant), a tablet-type terminal, a smartphone, or a mobile phone. The other output apparatus are output apparatus other than those described above.

The user environment E1 also includes a firewall F1. The firewall F1 may be the same as a typically used firewall. For example, the firewall F1 blocks request from outside the user environment E1.

The service providing system 70 may be accessed from environments other than the user environment E1. For example, the portable terminal 20e or the PC 20f may access the service providing system 70 via the Internet. The portable terminal 20e and the PC 20f may be used inside the user environment E1.

Figure 17:
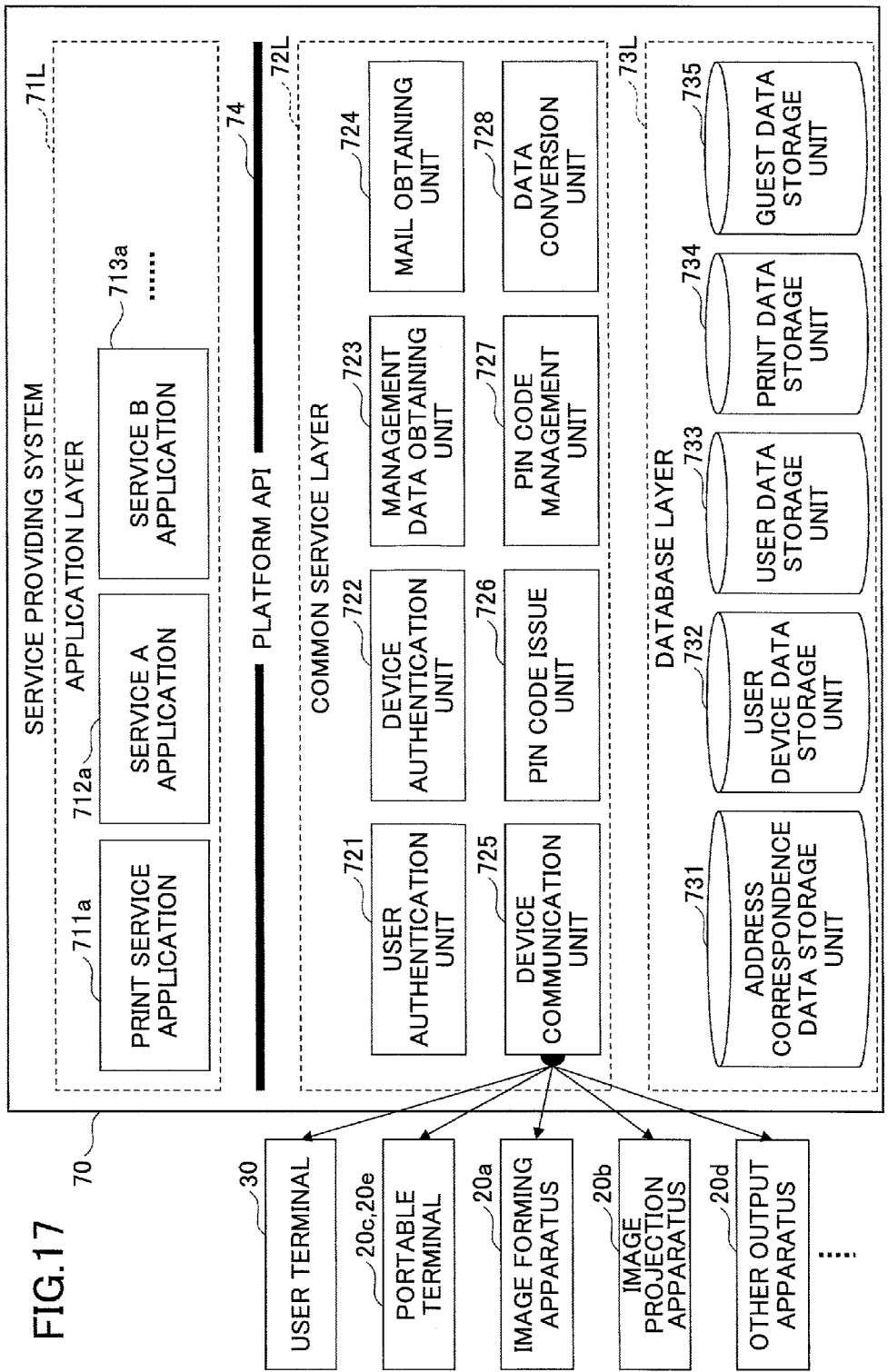
FIG. 17 is a schematic diagram illustrating functions of the service providing system 70 according to the fourth embodiment of the present invention.

FIG. 17 is a schematic diagram illustrating functions of the service providing system 70 according to the fourth embodiment of the present invention. The functions of the service providing system 70 of FIG. 17 may be categorized by, for example, an application layer 71L, a common service layer 72L, and a database layer 73L.

The application layer 71L is a layer installed with applications used by a server for cooperating with other devices such as the image forming apparatus 20a (hereinafter also referred to as "server application"). The application layer 71L of FIG. 17 includes, for example, a print service application 711a, a service A application 712a, and a service B application 713a.

The print service application 711a is a server application pertaining to a cloud printing service. In this embodiment, the print service application 711a is installed in the print service providing apparatus 711. The service A application 712a and the service B application 713a are examples of other server applications. The service A application 712a and the service B application 713a are installed in the service A providing apparatus 712 and the service B providing apparatus 713, respectively.

The common service layer 72L is a layer including, for example, functions shared by multiple server applications or basic functions used by multiple server applications. The functions of the common service layer 72L can be called via a platform API (Application Programming Interface) 74. The platform API 74 is basically called from the service applications installed in the application layer 71L. It is to be noted that the platform API 74 may be publicized with respect to, for example, a third vendor other than an administrator of the service providing system 70. In this case, server applications may be installed by the third vendor. That is, service applications may be developed and added by using the platform API 74.

The common service layer 72L of FIG. 17 includes, for example, a user authentication unit 721, a device authentication unit 722, a management data obtaining unit 723, a mail obtaining unit 724, a device communication unit 725, a PIN code issue unit 726, a PIN code management unit 727, and a data conversion unit 728.

The user authentication unit 721 authenticates a user. The device authentication unit 722 authenticates a corresponding relationship between the image forming apparatus 20a, a user, and an organization. The term "organization" may include, for example, a company of the above-described embodiments and other organizations. It is to be noted that, identification data corresponding to "company code" in the second embodiment is referred to as "organization code" in the fourth embodiment. Therefore, the authentication of the corresponding relationship between the user and the organization includes a process of determining (inspecting) whether the user and the image forming apparatus 20 belong to a corresponding organization.

The management data obtaining unit 723 obtains, for example, data stored in the database layer 73L in response to a request from the application layer 71L. The mail obtaining unit 724 obtains (receives) electronic mail stored in the mail server 40 in accordance with POP (Post Office Protocol) or the like. The device communication unit 725 performs communications between various devices. The PIN code issue unit 726 issues (generates) PIN codes. The PIN code management unit 727 manages PIN codes in correspondence with organization codes. The data conversion unit 728 converts data formats. In this embodiment, the data conversion unit 728 generates print data based on target print data.

It is to be noted that one or more programs, which are installed in the computers constituting the service providing system 70, cause the computers to execute various processes, to thereby implement each of the server applications of the application layer 71L and the components of the common service layer 72L.

The database layer 73L is a layer including a database (storage unit) that stores various data therein. The database layer 73L is implemented by using the database apparatus 73. The database layer 73L of FIG. 17 includes, for example, an address correspondence data storage unit 731, a user device data storage unit 732, a user data storage unit 733, a print data storage unit 734, and a guest data storage unit 735.

The address correspondence data storage unit 731 has substantially the same configuration as the configuration of the address correspondence data storage unit 18 (see FIG. 13). The user device data storage unit 732 has substantially the same configuration as the configuration of the user device data storage unit 64 (see FIG. 15). The user data storage unit 733 has a similar configuration as the user data storage unit 52 (see FIG. 6). The difference between the user data storage unit 733 and the user data storage unit 52 is described below. The print data storage unit 734 has substantially the same configuration as the configuration of the print data storage unit 62 (see FIG. 7). The guest data storage unit 735 has substantially the same configuration as the configuration of the guest data storage unit 19 (see FIG. 9). However, unlike the guest data storage unit 19, the guest data storage unit 735 is provided for each organization code.

It is to be noted that the categorization of each of the applications (software) and storage units illustrated in FIG. 17 is merely one example. Each of the applications (software) and storage units of the service providing system 70 does not necessarily need not be categorized into layers as illustrated in FIG. 17 for implementing the fourth embodiment of the present invention. That is, the layer relationship or the like of the applications (software) and storage units of the service providing system 70 are not to be limited in particular as long as the procedure of processes of the fourth embodiment can be executed.

Figure 18:
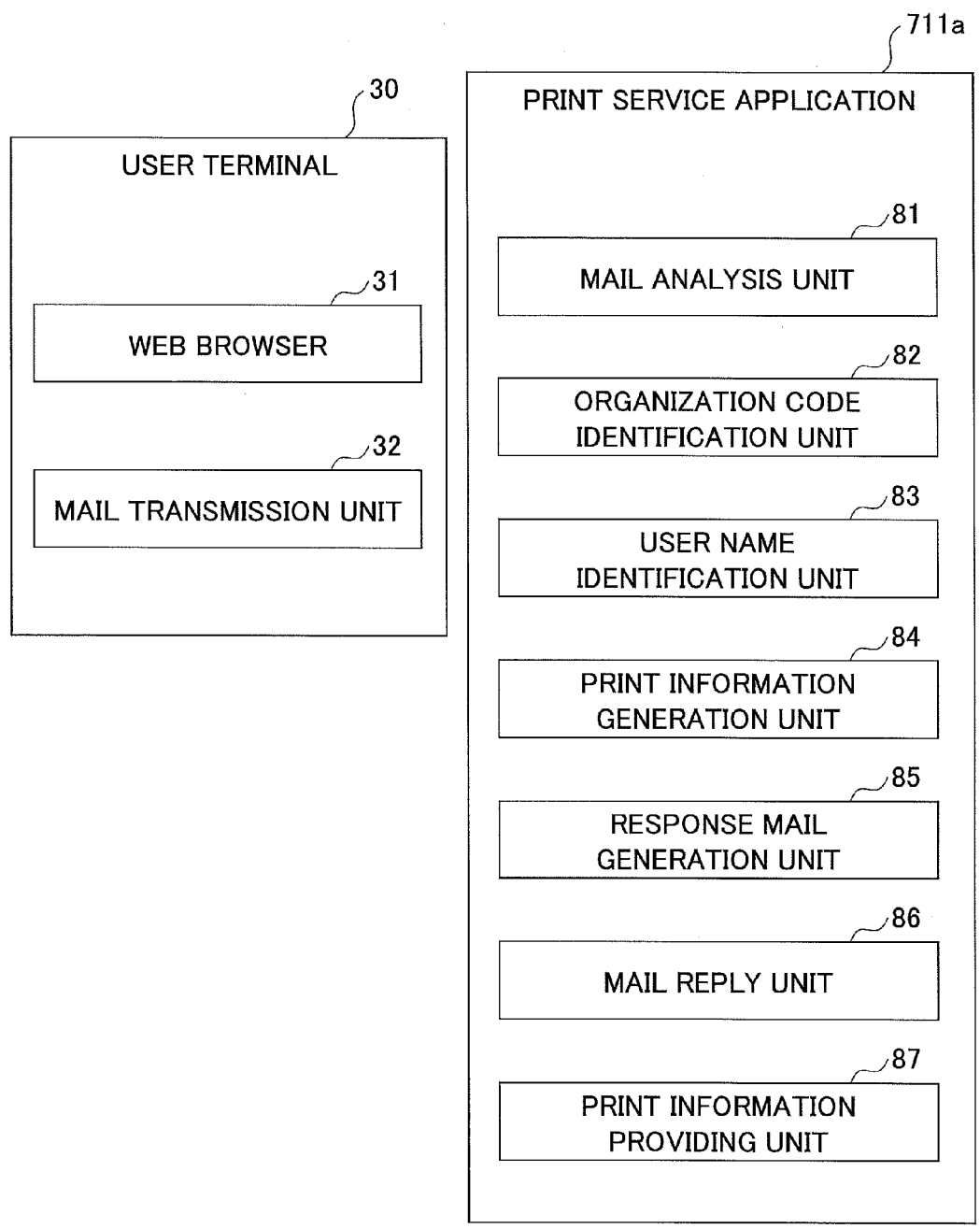
FIG. 18 is a schematic diagram illustrating a functional configuration of the user terminal 30 and the print service application according to the fourth embodiment of the present invention.

FIG. 18 is a schematic diagram illustrating a functional configuration of the user terminal 30 and the print service application according to the fourth embodiment of the present invention.

A Web browser 31 is a typical Web browser. A mail transmission unit 32 transmits electronic mail. In this embodiment, the mail transmission unit 32 transmits a print request mail. It is to be noted that the mail transmission unit 32 is implemented by causing the user terminal 30 to execute processes of a program referred to as a "mailer".

The print service application 711a includes, for example, a mail analysis unit 81, an organization code identification unit 82, a user name identification unit 83, a print information generation unit 84, a response mail generation unit 85, a mail reply unit 86, and a print information providing unit 87.

The mail analysis unit 81 analyzes a print request mail and extracts data (e.g., target print data) from the print request mail. The organization code identification unit 82 identifies an organization code corresponding to a transmission source address of a print request mail. The user name identification unit 83 identifies a user name corresponding to a transmission source address of a print request mail. The functions of the print information generation unit 84, the response mail generation unit 85, the mail reply unit 86, and the print information providing unit 87 are substantially the same as the functions of the print information generation unit 14, the response mail generation unit 15, the mail reply unit 16, and the print information providing unit 63 of FIG. 12.

Next, a procedure of processes performed according to the fourth embodiment of the present invention is described. First, an outline of the procedure of processes of the fourth embodiment is described by using a flowchart.

Figure 19:
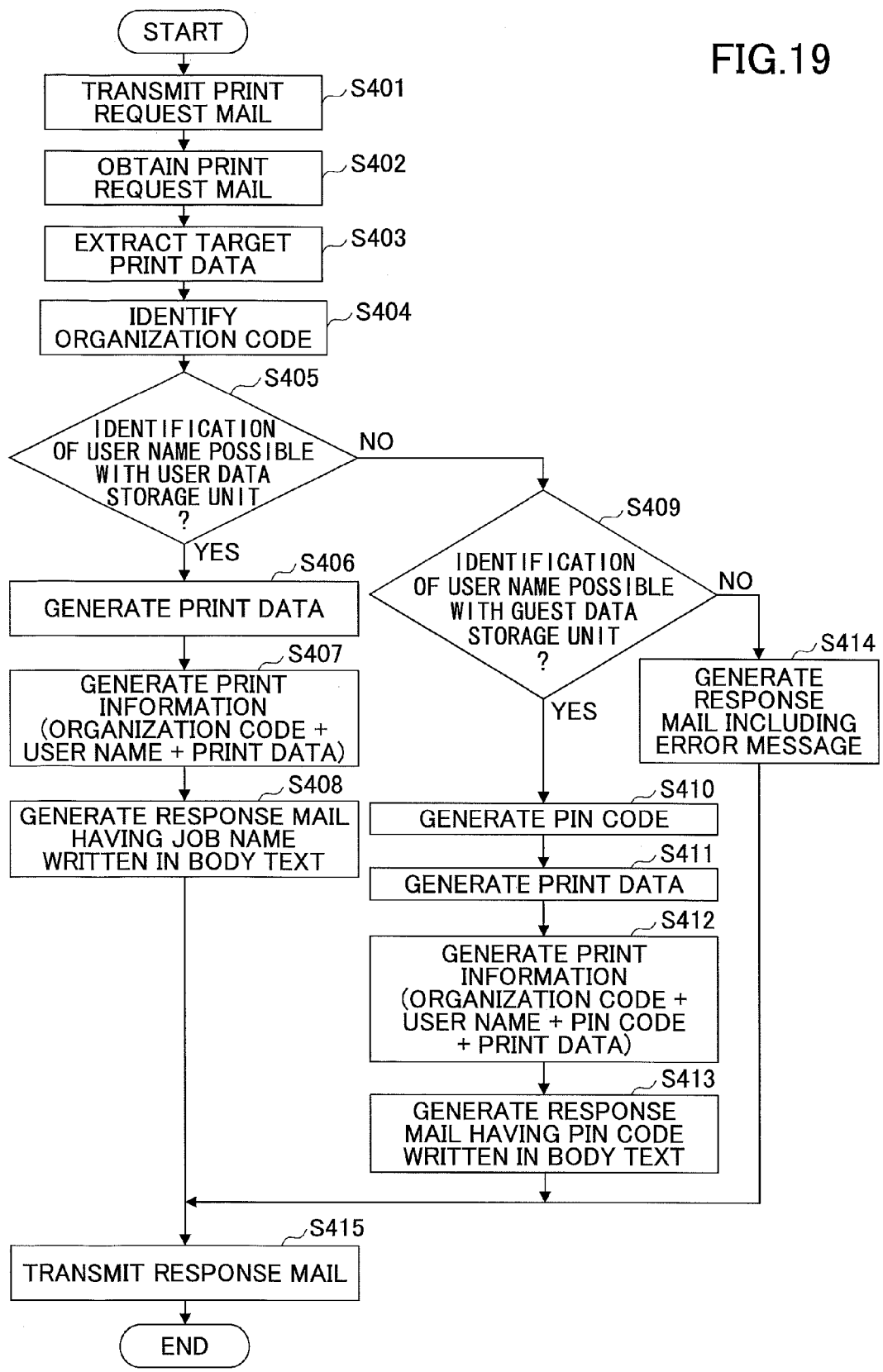
FIG. 19 is a flowchart illustrating a procedure of processes performed for registering print information based on a print request mail according to an embodiment of the present invention.

FIG. 19 is a flowchart illustrating a procedure of processes performed for registering print information based on a print request mail according to an embodiment of the present invention.

In Step S401, the mail transmission unit 32 of the user terminal 30 transmits a print request mail in accordance with an instruction input by a user. The print request mail is transmitted to an mail address assigned to an organization to which the user belongs. The contents of the print request mail is the same as those of the above-described embodiments of the present invention.

Then, the mail obtaining unit 724 of the service providing system 70 obtains the print request mail from the mail server 40 (Step S402). Then, the mail analysis unit 81 of the print service application 711a extracts a target print data from the print request mail (Step S403). Then, the organization code identification unit 82 of the print service application 711a identifies an organization code corresponding to the print request mail based on the destination address of the print request mail and the address correspondence data storage unit 731 (Step S404). That is, the organization code identification unit 82 obtains a corresponding organization code from the address correspondence data storage unit 731 that stores organization codes in association with destination addresses. It is to be noted that, in the fourth embodiment, the configuration of the address correspondence data storage unit 731 may be substantially the same as the configuration of the address correspondence data storage unit 64 (see FIG. 15). It is, however, to be noted that "company code" of the address correspondence data storage unit 64 is to be replaced with "organization code" in the fourth embodiment.

Then, the user name identification unit 83 of the print service application 711a determines whether it is possible to identify a user name of a regular user corresponding to the transmission source address of the print request mail by referring to the user data storage unit 73 (Step S405). More specifically, the user name identification unit 83 determines whether the transmission source address of the print request mail corresponding to the organization code identified in Step S404 (hereinafter also referred to as "target organization code") is stored in the user data storage unit 733.

FIG. 20 is a schematic diagram illustrating a configuration of the user data storage unit 733 according to the fourth embodiment of the present invention. In addition to having same data items as the user data storage unit 52 (see FIG. 6), the user data storage unit 733 of FIG. 20 also includes data items "organization code" and "role".

The data item "role" is data for distinguishing whether each user is an administrator or a user. An administrator is an administrator of devices (e.g., image forming apparatus 20a) that coordinate with the service providing system 70. The administrator performs operations for coordinating the service providing system 70 with devices such as the image forming apparatus 20a. The user is a user that uses the services provided by the service providing system 70.

In Step S405, it is determined whether user data including the target organization code and the transmission source address exists among the user data stored in the user data storage unit 733. In a case where such user data exists, the user name included in the user data (hereinafter also referred to as "target user name") is identified.

In a case where the target user name is identified (Yes in Step S405), the data conversion unit 728 of the service providing system 70 generates print data pertaining to the target print data (Step S406). It is to be noted that in a case where the target print data has a format that allows the target print data to be printed without data conversion, the process of generating print data may be omitted.

Then, the print data generation unit 84 generates print information (Step S407). The generated print information includes, for example, a job name, a target organization code, a target user name, and print data. The print information generation unit 84 stores the generated print information in the print information storage unit 734.

Then, the response mail generation unit 85 of the print service application 711a generates a response mail (Step S408). The response mail includes, for example, a job name. Then, the mail reply unit 86 transmits the response mail to the transmission source address of the print request mail (Step S415).

On the other hand, in a case where the user name of the regular user corresponding to the transmission source address cannot be identified by using the user data storage unit 733 (No in Step S405), the user name identification unit 83 determines whether the user name of the regular user corresponding to the transmission source address can be identified by using the guest data storage unit 735 (Step S409). More specifically, the user name identification unit 83 determines whether a record having the transmission source address as its guest mail address is included in the guest data storage unit 735. In a case where a corresponding record is stored in the guest data storage unit 735, the user name of the regular user corresponding to the record is identified as the target user name.

In a case where the target user name is identified (Yes in Step S409), the PIN code issue unit 726 of the service providing system 70 generates a PIN code (Step S410). The processes performed in and after Step S411 are substantially the same the processes performed on and after Step S407. It is to be noted that the print information generated in Step S412 includes, for example, a job name, an organization code, a target user name, a PIN code, and print data. Further, in Step S413, a response mail including a PIN code and a job name is generated.

In a case where the user name of the regular user cannot be identified even by using the guest data storage unit 735 (No in Step S409), the response mail generation unit 15 generates a response mail including an error message (hereinafter also referred to as "error mail") (Step S414). Then, in this case, the generated error mail is transmitted in Step S415. Further, in this case, print information is not generated. Therefore, the processes performed in Steps S109 and S110 of FIG. 5 are not performed. That is, the user is unable to perform printing.

Next, a case registering print information by using the Web browser 31 of the user terminal 30 is described. That is, in the fourth embodiment, print information may be registered with a method other than transmitting a print request mail.

Figure 21:
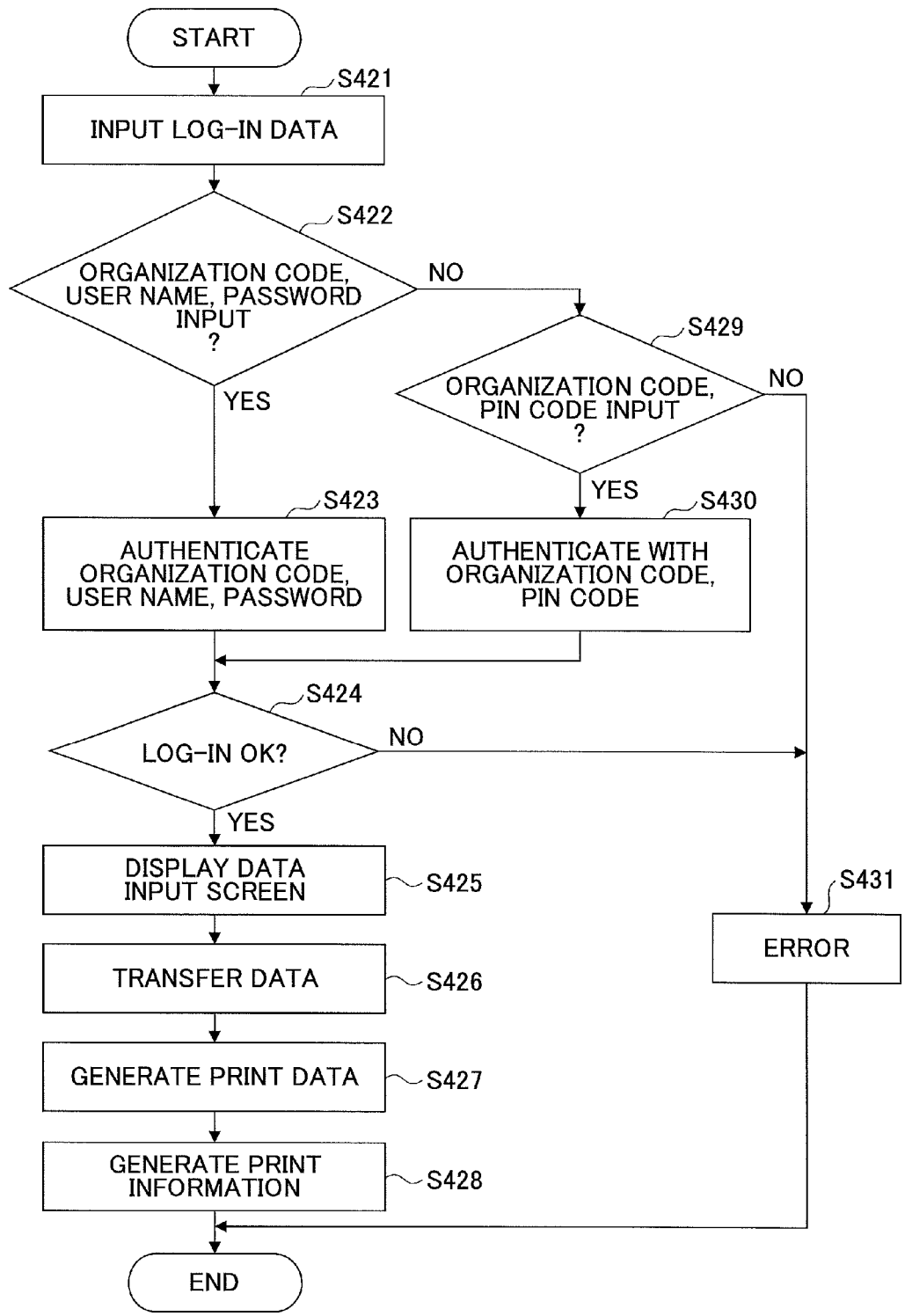
FIG. 21 is a flowchart for describing a sequence of processes for registering print information by using a Web interface according to an embodiment of the present invention.

FIG. 21 is a flowchart for describing a sequence of processes for registering print information by using a Web interface according to an embodiment of the present invention. In an initial state of FIG. 21, a screen for logging in to the service providing system 70 is displayed on the Web browser 31 of the user terminal 30.

In Step S421, the Web browser 31 accepts (receives) input of log-in data from the user via a log-in screen.

Figure 22:
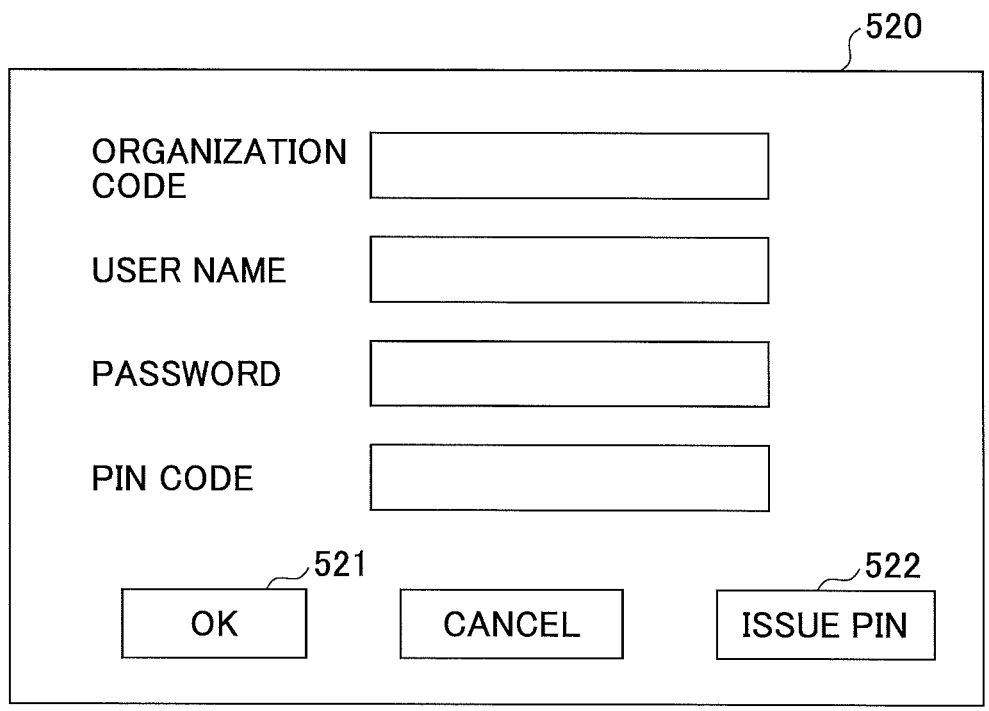
FIG. 22 is a schematic diagram illustrating a log-in screen 520 displayed on a user terminal according to the fourth embodiment of the present invention.

FIG. 22 is a schematic diagram illustrating a log-in screen 520 displayed on a user terminal according to the fourth embodiment of the present invention. The log-in screen 520 illustrated in FIG. 22 includes input areas for inputting, for example, an organization code, a user name, a password, and a PIN code. The log-in screen 520 also includes, for example, an OK button and a PIN issue button.

In this embodiment, there are two patterns (methods) for logging in. The first pattern is to designate an organization code, a user name, and a password (pattern 1). The second pattern is to designate an organization code and a PIN code (pattern 2). In the case of pattern 2, a PIN code is to be issued to the user beforehand. The PIN issue button 522 is to be pressed for having a PIN code issued to the user. The procedure of processes performed when the PIN issue button 522 is pressed is described below.

In a case where the OK button 521 of the log-in screen 520 is pressed, the Web browser 31 determines whether an organization code, a user name, and a password have been input to the log-in screen 520 (Step S422). It is to be noted that the processes performed by the Web browser 31 are based on definitions of a Web page (e.g., HTML (HyperText Markup Language) of the log-in screen 520 displayed by the Web browser 31.

In a case where an organization code, a user name, and a password are input to the log-in screen 520 (Yes in Step S422), the Web browser 31 receives authentication by the service providing system 70 based on the input organization code, user name, and password (S423). More specifically, the input organization code, user name, and password are transmitted to the user authentication unit 721. Then, the user authentication unit 721 performs authentication by determining whether the set of the input organization code, user name, and password is stored in the user data storage unit 733.

In a case where the authentication is a success and log-in is permitted (Yes in Step S424), the Web browser 31 displays a data input screen (S425). The data input screen is a screen for allowing the user to select a file to be printed from the files stored in the user terminal 30. When a file is selected by the user via the data input screen, data stored in the selected file is transferred from the Web browser 31 to the service providing system 70 (Step S426).

When the service providing system 70 receives the data, the same processes as the processes performed in Steps S406 and S407 of FIG. 19 are performed (Step S427, S428). As a result, print information including print data that is based on the received data is stored in the print data storage unit 734.

On the other hand, in a case where an organization code, a user name, and a password are not input to the log-in screen 520 (No in Step S422), the Web browser 31 determines whether data input to the log-in screen 520 are an organization code and a PIN code (Step S429). In a case where the data input to the log-in screen 520 are an organization code and a PIN code (Yes in Step S429), the Web browser 31 receives authentication by the service providing system 70 based on the input organization code and PIN code (S430). More specifically, authentication is performed by determining whether the set of the input organization code and PIN code is stored in the service providing system 70.

In a case where the authentication is a success and log-in is permitted (Yes in Step S424), the processes performed on and after Step S425 are performed. As a result, print information including the input organization code, the input PIN code, and a user name of a regular user corresponding to the input PIN code are stored in the print data storage unit 734. The user name of the regular user corresponding to the PIN code is identified by using the below-described PIN code management table.

It is to be noted that in a case where the input pattern performed on the log-in screen 520 is neither the first pattern nor the second pattern (No in Step S429) or a case where log-in is a failure (No in Step S424), the Web browser 31 displays an error screen (Step S431). In this case, print information is not registered.

Next, a process of issuing a PIN code via a Web interface is described. The process of issuing a PIN code is performed before the authentication process based on the organization code and the PIN code.

Figure 23:
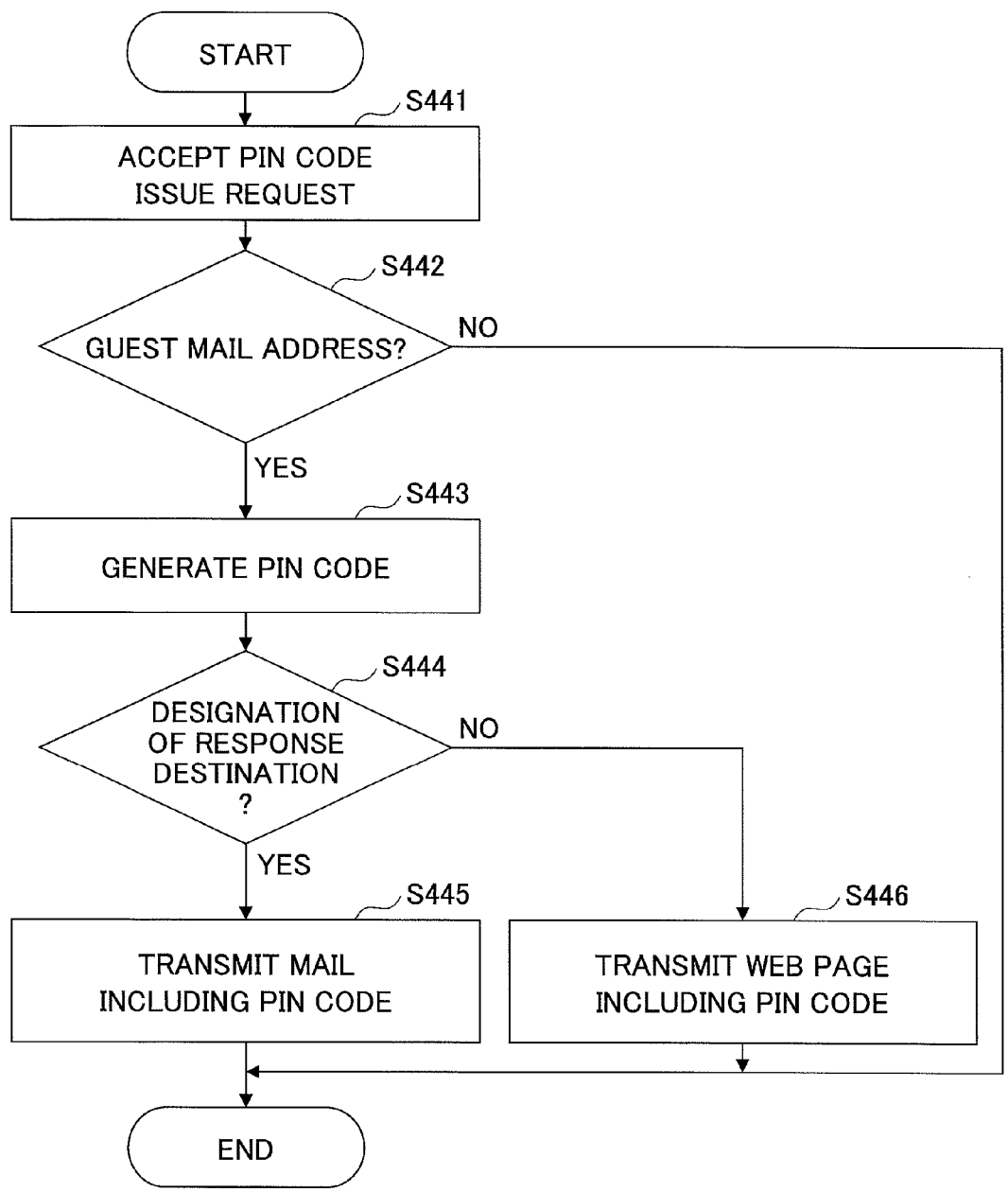
FIG. 23 is a flowchart for describing a sequence of processes for issuing a PIN code via a Web interface according to an embodiment of the present invention.

FIG. 23 is a flowchart for describing a sequence of processes for issuing a PIN code via a Web interface according to an embodiment of the present invention. In an initial state of FIG. 23, the log-in screen 520 (see FIG. 22) is displayed on the Web browser 31 of the user terminal 30.

In Step S441, the Web browser 31 accepts (receives) a request for issuance of a PIN code (PIN code issue request). The PIN code issue request is accepted after the user inputs an organization code to the log-in screen 520 and presses the PIN issue button 522. It is to be noted that the Web browser 31 may display a response destination address designation screen (see FIG. 24) in response to the pressing of the PIN issue button 522.

Figures 24, 25:
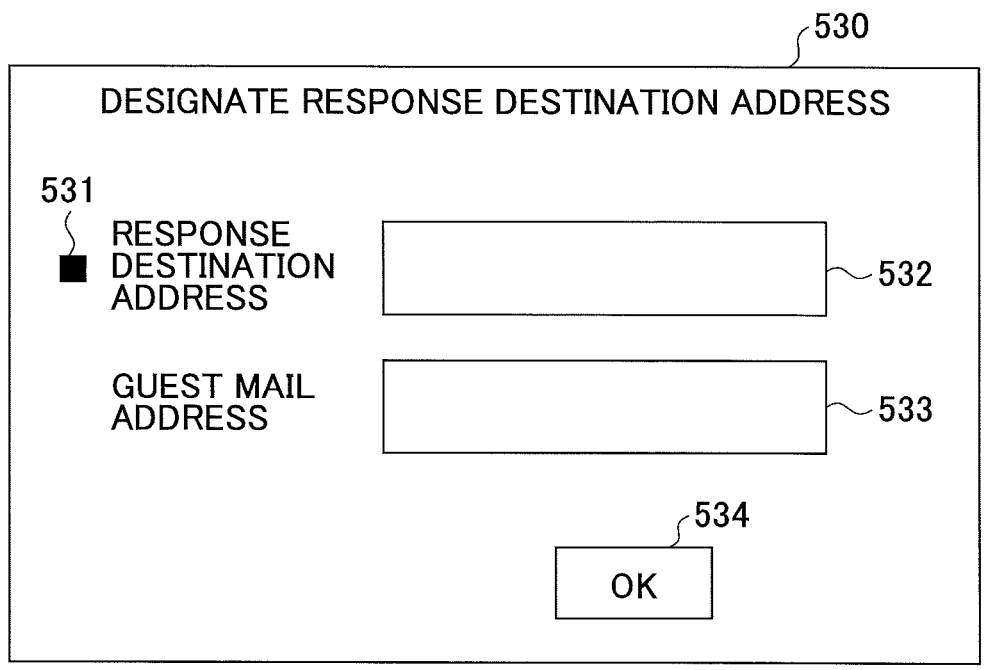
FIG. 24 is a schematic diagram illustrating a response destination address designation screen 530 according to an embodiment of the present invention.
FIG. 25 is a schematic diagram illustrating a configuration of a PIN code management table according to an embodiment of the present invention.

FIG. 24 is a schematic diagram illustrating a response destination address designation screen 530 according to an embodiment of the present invention. In FIG. 24, the response destination address designation screen 530 includes, for example, a check button 531, a response destination address input area 532, a guest mail address input area 533, and an OK button 534.

The response destination address input area 532 is for inputting a mail address of a destination (transmission destination) for receiving electronic mail including an issued PIN code (response destination address). The check button 531 is for indicating whether an issued PIN code is desired to be notified by electronic mail. In a case where the check button 531 is checked, data can be input to the response destination address input area.

The guest mail address input area 533 is for inputting a mail address of a guest user.

When the OK button 534 is pressed, the Web browser 31 transmits a PIN code issue request to the service providing system 70. The PIN code issue request includes the organization code and the guest mail address input via the log-in screen 520. In a case where a response destination address is input to the response destination address designation screen 530, the input response destination address is also included in the PIN code issue request.

Then, the PIN code issue unit 726 of the service providing system 70 determines whether the guest mail address included in the PIN code issue request is stored in the guest data storage unit 735 (Step S442). In a case where the guest mail address included in the PIN code issue request is not stored in the guest data storage unit 735 (No in Step S442), the PIN code issue unit 726 does not issue a PIN code. In this case, the service providing system 70 may, for example, transmit an electronic mail indicating an error or return a Web page to Web browser 31.

In a case where the guest mail address included in the PIN code issue request is stored in the guest data storage unit 735 (Yes in Step S442), the PIN code issue unit 726 generates a PIN code (Step S443). The PIN code is associated with the organization code included in the PIN code issue request and with the user name of the regular user corresponding to the guest mail address included in the PIN code issue request. The PIN code associated with the organization code and the user name of the regular user is managed by the PIN code management unit 727. The user name of the regular user corresponding to the guest mail address is a user name of a regular user stored in correspondence with the guest mail address in the guest data storage unit 735. The PIN code management unit 727 uses, for example, the PIN code management table (see FIG. 25) to manage the organization code, the PIN code, and the user name of the regular user that are associated with each other.

FIG. 25 is a schematic diagram illustrating a configuration of a PIN code management table according to an embodiment of the present invention. In the PIN code management table of FIG. 25, PIN codes generated by the PIN code issue unit 726 are stored in correspondence with organization codes and user names of regular users. The PIN code management table can be implemented by using, for example, a memory or auxiliary storage device of a computer that includes the PIN code management unit 72. It is to be noted that multiple different PIN codes may be associated with the same organization code. This is because PIN codes may be issued to different users belonging to the same organization (company).

Then, the PIN code management unit 727 determines whether there is a designated response destination address included in the PIN code issue request (Step S444). In a case where a response destination address is designated (Yes in Step S444), the PIN code management unit 727 transmits an electronic mail including a generated PIN code to the designated response destination address (Step S445). In a case where a response destination address is not designated (No in Step S444), the PIN code management unit 727 transmits a reply including data of a Web page to the Web browser 31 in response to the PIN code issue request (Step S446). The data of the Web page is used for displaying the generated PIN code.

Regardless of the outcome of Step S444, the user can confirm the generated PIN code. Thereby, the user can log-in with the above-described second pattern (FIG. 21) by using the generated PIN code.

It is to be noted that a set of a user name and a password or authentication data of a regular user may be input instead of inputting a guest mail address to the response destination address designation screen 530. In this case, it is determined whether an input user name included in the PIN code issue request is stored in the user data storage unit 733. In a case where the input user name is stored in the user data storage unit 733, a PIN code is issued.

Figure 26:
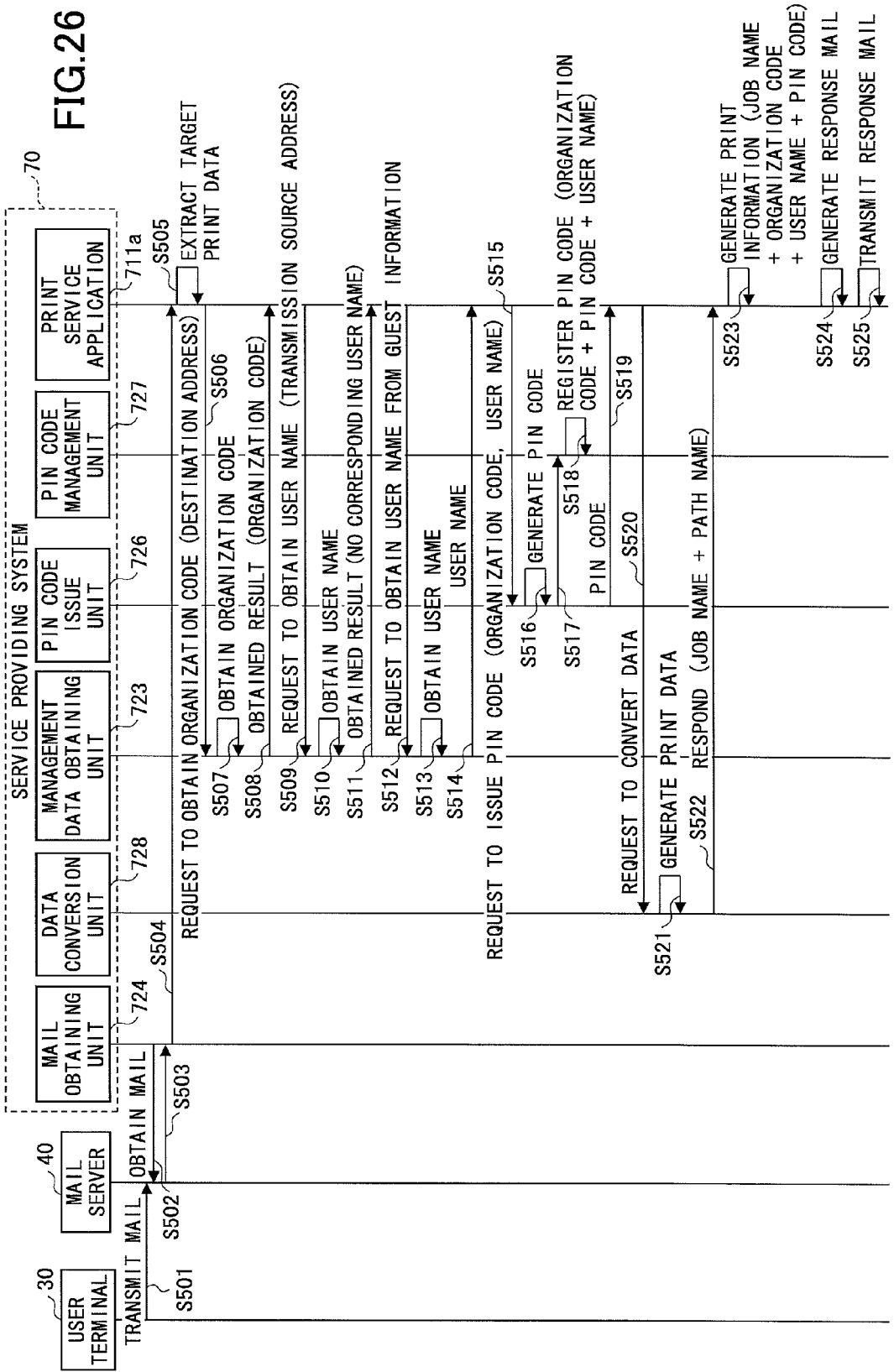
FIG. 26 is a diagram for describing a sequence of processes for registering print information and issuing a PIN code based on a print request mail according to an embodiment of the present invention.

Next, a part of the processes of the flowchart of FIG. 23 is described by referring to the flowchart of FIG. 26.

FIG. 26 is a diagram for describing a sequence of processes for registering print information and issuing a PIN code based on a print request mail according to an embodiment of the present invention. That is, FIG. 26 is a sequence diagram for describing a case where a user name corresponding to a transmission source mail cannot be identified by using the user data storage unit 733 (No in Step S405 of FIG. 19).

In Step S501, the mail transmission unit 32 of the user terminal 30 transmits a print request mail to a mail address assigned to an organization to which the user belongs. The print request mail is transferred to the mail server 40 by using, for example, SMTP (Simple Mail Transfer Protocol).

The mail obtaining unit 724 of the service providing system 70 obtains the print request mail stored in the mail server 40 by using, for example, POP (Post Office Protocol) (Steps S502, S503). Then, the mail obtaining unit 724 transfers the print request mail to the print service application 711a (S504). The mail analysis unit 81 of the print service application 711a extracts a target print data from the print request mail (Step S505).

Then, an organization code identification unit 82 of the print service application 711a requests the management data obtaining unit 723 to obtain an organization code corresponding to a destination address of the print request mail (Step S506). The management data obtaining unit 723 obtains an organization code stored in association with the destination address in the address correspondence data storage unit 731 (see FIG. 13) (Step S507). Then, the management data obtaining unit 723 transmits the obtained organization code (hereinafter also referred to as "target organization code") to the organization code identification unit (Step S508).

Then, the user name identification unit 83 of the print service application 711a requests the management data obtaining unit 723 to obtain a user name corresponding to a transmission source address of the print request mail from the user data storage unit 733 (Step S509). Then, the management data obtaining unit 723 attempts to obtain a user name stored in correspondence with the transmission source address in the user data storage unit 733 (see FIG. 20) (Step S510). In this example, it is assumed that the management data obtaining unit 723 is unable to obtain a corresponding user name. Accordingly, the management data obtaining unit 723 transmits a response to user name identification unit 83 to report that there is no corresponding user name (Step S511).

In response to the response from the management data obtaining unit 723, the user name identification unit 83 requests the management data obtaining unit 723 to obtain a user name corresponding to a user name corresponding to the transmission source address of the print request mail from the guest data storage unit 735 (Step S512). The management data obtaining unit 723 attempts to obtain a user name (user name of regular user) stored in correspondence with the transmission source address in the guest data storage unit 735 (see FIG. 9) (Step S513). In this example, it is assumed that the management data obtaining unit 723 is able to obtain a corresponding user name. Accordingly, the management data obtaining unit 723 transmits a response to the user name identification unit 83 to report that there is a corresponding user name (Step S514).

In response to the identification of the user name by referring to the guest data storage unit 735, the user name identification unit 83 designates a target organization code and the identified user name (hereinafter also referred to as "target user name") and requests the PIN code issue unit 726 to issue a PIN code (Step S515). Then, the PIN code issue unit 726 generates a PIN code (Step S516) and transmits the generated PIN code together with the target organization code to the PIN code management unit 727 (Step S517). Then, the PIN code management unit 727 associates the target organization code, the PIN code, and the target user name with each other and registers the associated target organization code, PIN code, and target user name in the PIN code management table (see FIG. 25) (Step S518). The PIN code issue unit 726 also transmits a response including the PIN code to the user name unit 83 (Step S519).

Then, the print information generation unit 84 requests the data conversion unit 728 to convert the target print data into print data (Step S520). The data conversion unit 728 generates print data based on the target print data and stores the generated print data in an auxiliary storage device (Step S521). It is to be noted that the data conversion unit 728 assigns identification data (data ID) to the generated print data. In the fourth embodiment, the data ID is a job name. Then, the data conversion unit 728 transmits a response to the print information generation unit 84 (Step S522). The response transmitted to the print information generation unit 84 includes a job name and a path name of a file having the print data stored therein.

The print information generation unit 84 generates print information including a job name, a target organization code, a target user name, a PIN code and a path name of a file having print data stored therein (Step S523). It is to be noted, although print data is included in the print information in the above-described example, print data itself need not be included in the print information in a case where print information includes data that allows print data to be identified such as a path name of print data. Therefore, a path name of print data may also be stored as an item of the print data illustrated in FIG. 14.

Then, the response mail generation unit 85 of the print service application 711a generates a response mail including, for example, a job name and a PIN code (Step S524). Then, the mail reply unit 86 transmits the generated response mail to the transmission source address of the print request mail (Step S525).

Figure 27:
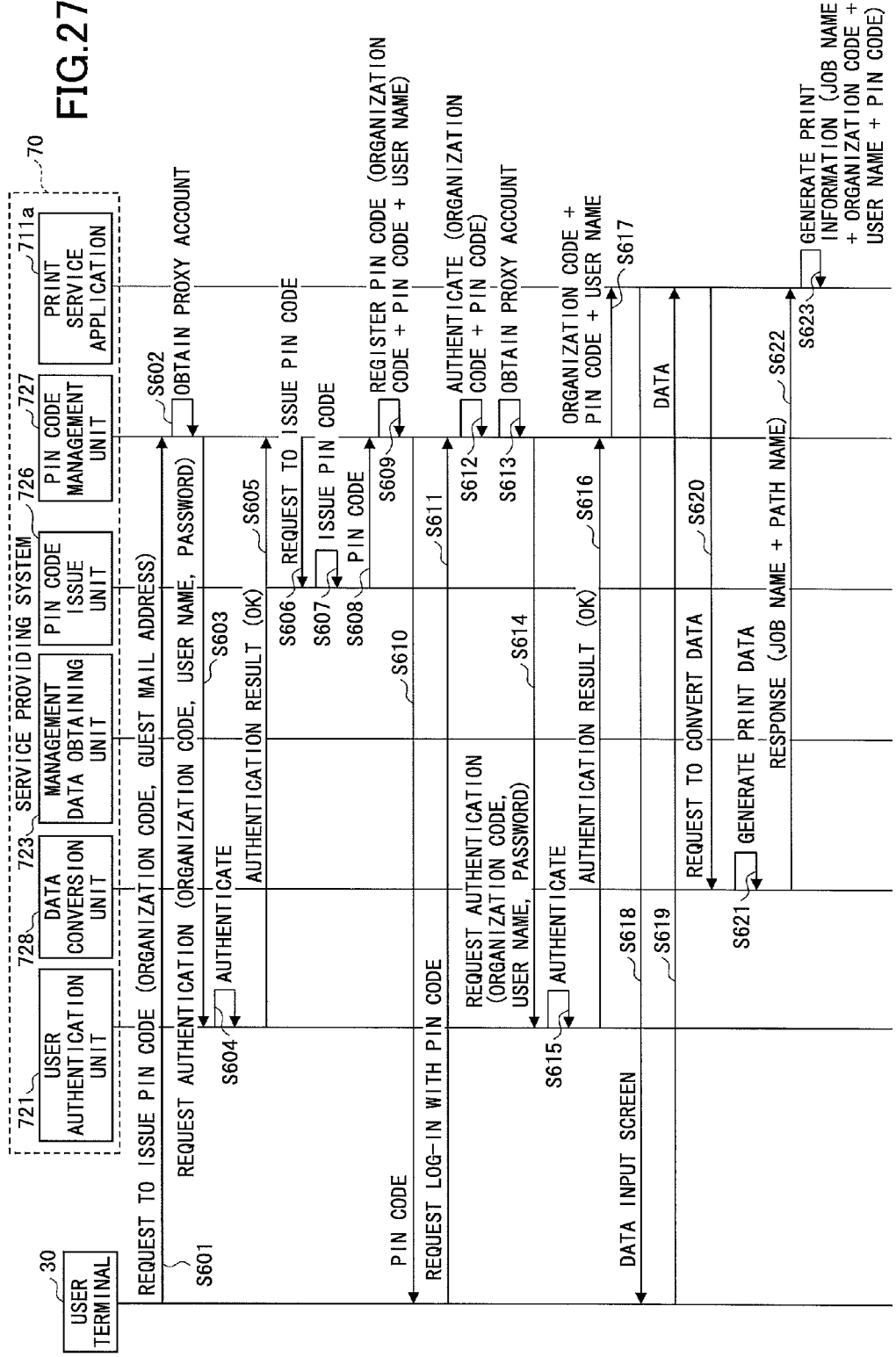
FIG. 27 is a diagram for describing a sequence of processes for registering print information and issuing a PIN code via a Web interface according to an embodiment of the present invention.

FIG. 27 is a diagram for describing a sequence of processes for registering print information and issuing a PIN code via a Web interface according to an embodiment of the present invention. That is, FIG. 27 is a sequence diagram for describing a case of registering print information by issuing a PIN code and logging in by using an organization code and a PIN code as illustrated in FIGS. 21 and 23.

In response to data input to, for example, the log-in screen 520 and the response destination address designation screen 530, the Web browser 31 of the user terminal 30 designates an organization code (target organization code) and a guest mail address and transmits a PIN code issue request including the designated target organization code and the guest mail address to the service providing system 70 (Step S601).

In response to the PIN code issue request, the PIN code management unit 727 obtains a substitute account from a substitute account management table (Step S602). The substitute account is an account to be used instead an actual account (user name and password) for a user. That is, a user that has requested the issuing of a PIN code is likely to have no account. Thus, the user authentication unit 721 would be unable to perform authentication for such user without an account. This will result in the user being unable to log in to the service providing system 70. In view of this situation, the substitute account can be used.

FIG. 28 is a schematic diagram illustrating a configuration of a substitute account management table according to an embodiment of the present invention. In FIG. 28, a user name and a password of a substitute account is registered in correspondence with an organization code in the substitute account management table. Therefore, in Step S602, a user name and a password corresponding to the organization code (target organization code) designated in the PIN code issue request are obtained.

It is to be noted that a user name and password of an administrator of each organization may be used as a substitute account.

Then, the PIN code management unit 727 designates a target organization code, and a user name and password of the substitute account, and transmits an authentication request including the designated target organization code and designated user name/password of the substitute account to the user authentication unit 721 (Step S603). The user authentication unit 721 performs an authentication process on the organization code, the user name, and the password by referring to the user data storage unit 733 (Step S604). Then, the user authentication unit 721 transmits an authentication result to the PIN code management unit 727 (Step S605).

In a case where the authentication is a success, the PIN code management unit 727 request the PIN code issue unit 726 to issue a PIN code (Step S606). The PIN code issue unit 726 generates a PIN code (Step S607) and transmits the generated PIN code to the PIN code management unit 727 (Step S608). The PIN code management unit 727 associates a user name with the target organization code, the generated PIN code, and the guest mail address and registers the user name and associated data in the PIN code management table (see FIG. 25) (Step S609). Thus, a user name corresponding to a guest mail address can be identified by referring to the guest data storage unit 735.

Then, the PIN code management unit 727 transmits a response including the PIN code to, for example, the user terminal 30 (Step S610). The manner of reporting (notifying) the PIN code is not limited to the form of electronic mail. For example, the PIN code may also be reported in the form of a Web Page. In a case where electronic mail is used to report the PIN code, an electronic mail including the PIN code is transmitted to the response destination address designated in the PIN code issue request. Therefore, a terminal other than the user terminal 30 is able to receive the electronic mail including the PIN code.

A user, which has obtained a PIN code, can log in to the service providing system 70 by using the PIN code. Accordingly, the user inputs an organization code and the PIN code to the log-in screen 520 (see FIG. 22) displayed on the Web browser 31 of the user terminal 30, and presses the OK button 521. In response to the pressing of the OK button 521, the Web browser 31 transmits a log-in request using the PIN code to the service providing system (Step S611). The log-in request includes a designation of the organization code and PIN code input to the log-in screen 520. In a case where uniqueness is ensured for PIN codes outside of an organization, the designation may only be the PIN code input to the log-in screen 520. In the below-described processes, data is identified by referring to a combination of an organization code and a PIN code. However, in the case of designating only the PIN code input to the log-in screen 520, data may be identified by referring only to the PIN code in the below-described processes.

The PIN code management unit 727 of the service providing system 70 performs an authentication process on the designated organization code and the PIN code included in the log-in request (Step S612). More specifically, the PIN code management unit 727 determines whether a set of the designated organization code and the PIN code is stored in the PIN code management table. In a case where the set of the organization code and the PIN code is stored in the PIN code management table, the authentication process is a success. In a case where the set of the organization code and the PIN code is not stored in the PIN code management table, the authentication process is a failure.

In the case where the authentication of the PIN code is a success, an authentication process using the substitute account is performed with a procedure of processes similar to the procedure performed from Steps S602 to S605. In a case where the authentication process using the substitute account is a success, log-in is a success. Then, the PIN code management unit 727 reports (notifies) the successfully authenticated organization code, the PIN code, and the user name (target user name) associated with the organization code and PIN code are reported to the print service application 711a (Step S617).

Then, the print service application 711a transmits a reply in response to the PIN code log-in request to the user terminal 30 (Step S618). The reply include data of a Web page for displaying a data input screen. The Web browser 31 of the user terminal 30 displays a data input screen base on the data of the Web page.

In a case where the user selects a file from the data input screen displayed on the user terminal 30, the Web browser 31 transmits data included the selected file to the print service application 711a (Step S619). Then, by performing the processes of Steps S520 to S523 of FIG. 26, the print service application 711a generates print data pertaining to the data included in the selected file. Then, print information including a job name, a target organization code, a target user name, a PIN code, and a path name of the generated print data is stored in the print data storage unit 734 (Steps S620-S623).

FIG. 29 is a diagram for describing a sequence of processes for outputting print data according to an embodiment of the present invention. That is, FIG. 29 is a sequence diagram for describing a case of using the image forming apparatus 20a to execute a print job based on print data included in print information registered by the processes illustrated in FIG. 26 or FIG. 27.

Steps S701-S710 of FIG. 29 are processes performed in a case where a regular log-in (i.e. log-in based on an organization code, a device ID, a user name, and a password) is performed from the image forming apparatus 20a. On the other hand, Steps S801-S810 of FIG. 29 are processes performed in a case where a PIN code log-in (i.e. log-in based on an organization code, a device ID, and a PIN code) is performed from the image forming apparatus 20a.

In a case where the user inputs a user name and a password via the log-in screen 510 (see FIG. 11) displayed on the operation panel 25 of the image forming apparatus 20a and presses the OK button 511, the authentication control unit 221 transmits a log-in request to the service providing system 70 (Step S701). The log-in request includes designations of an organization code, a device ID, a user name, and a password. Alternatively, the organization code and the device ID may be stored beforehand in the HDD 214 of the image forming apparatus 20a. Alternatively, the organization code may be input via the log-in screen 510. In this case of inputting the organization code, the log-in screen 510 may include an input area for inputting the organization code.

In a case where the service providing system 70 receives the log-in request, the device authentication unit 722 performs an authentication process (Step S702). More specifically, authentication is determined to be a success in a case where the following two conditions are satisfied. The first condition is that a set of the organization code and the device ID designated in the log-in request is stored in the user device data storage unit 732 (see FIG. 15). The second condition is that a set of the organization code (target organization code), the user name (target user name), and the password designated in the log-in request is stored in the user data storage unit 733 (see FIG. 20).

In a case where the authentication process is a success, the device authentication unit 722 designates the target organization code and the target user name and transmits a request to obtain a list of print information to the print service application 711a (Step S703). The request transmitted from the device authentication unit includes, for example, an authentication result, the target organization code, and the target user name.

The print information providing unit 87 of the print service application 711a obtains a list of print information including the target organization code and the target user name (Step S704). It is to be noted that the actual data (content) of the print data does not necessarily need to be obtained. Then, the print information obtaining unit 87 transmits a reply including data indicating the success of the authentication and the list of the obtained print information to the image forming apparatus 20a (Step S705).

The print information obtaining unit 222 of the image forming apparatus 20a displays, for example, a list of job names included in the obtained print information on the operation panel (Step S706). In a case where at least one job name is selected from the list displayed on the operation panel, the print information obtaining unit 222 transmits a request to obtain print data corresponding to the selected job name to the print service application 711a (Step S707). The print information providing unit 87 of the print service application 711a obtains print data associated with the job name designated in the request from the print information obtaining unit 222 (Step S708). In obtaining the print data, the print information providing unit 87 refers to the print information storage unit 734 and obtains the print data stored in correspondence with the designated job name. Then, the print information providing unit 87 transmits the obtained print data to the image forming apparatus 20a (Step S709).

The print control unit 223 of the image forming apparatus 20a controls execution of a print job pertaining to the print data (Step S710). As a result, a sheet of paper having the print data printed thereon is output from the image forming apparatus 20a. The billing destination that is to pay for the cost incurred by performing the print job may be identified based on, for example, the target user name.

Next, a case of logging in by using a PIN code (PIN code log-in) is described.

In a case where the user inputs a PIN code via the log-in screen 510 (see FIG. 11) displayed on the operation panel 25 of the image forming apparatus 20a and presses the OK button 511, the authentication control unit 221 transmits a log-in request to the service providing system 70 (Step S801). The log-in request includes designations of an organization code, a device ID, and a PIN code.

Then, the same processes as those performed in Steps S612-S616 of FIG. 27 are performed (Step S802-S806). Then, the PIN code management unit 727 transmits a request to obtain print data to the print service application 711a (Step S807). The request transmitted to the print service application 711a includes designations of the organization code and PIN code (successfully authenticated in Step S802)

along with a user name stored in correspondence with the organization code and the PIN code in the PIN code management table (target user name).

Then, the print information providing unit 87 of the print service application 711a obtains print data associated with the organization code and PIN code designated in the request from the print information obtaining unit 222 (Step S808). In obtaining the print data, the print information providing unit 87 refers to the print information storage unit 734 and obtains the print data stored in correspondence with the designated organization code and PIN code. Then, the print information providing unit 87 transmits the obtained print data to the image forming apparatus 20a (Step S809).

The print control unit 223 of the image forming apparatus 20a controls execution of a print job pertaining to the print data (Step S810). As a result, a sheet of paper having the print data printed thereon is output from the image forming apparatus 20a. The billing destination that is to pay for the cost incurred by performing the print job may be identified based on, for example, the target user name.

In the above-described case of performing PIN code log-in of FIG. 29, a list of print information is not provided to the image forming apparatus 20a. This is because the user that has logged in by using the PIN code is likely to be a guest user temporarily using the image forming apparatus 20a. Thus, the amount of print data stored in correspondence with the organization code and PIN code designated by the guest user is likely to be small. In other words, the guest user is likely to desire all of the stored print data to be printed. It is, however, to be noted that the processes performed on and after Step S705 may also be performed even in the case of performing the PIN code log-in. In other words, the user may select print data to be printed (target print data) from print data stored in correspondence with the PIN code designated in the PIN code log-in request.

In the above-described embodiments, one or more of the management server 10, the authentication server 50, and the storage server 60 is an example of a data process system. Further, the service providing system 70 is another example of a data process system. The print data is an example of output data. That is, the above-described embodiments may also be applied to a case where data other than print data is output from a device other than the image forming apparatus 20. One or more of the mail reception unit 111 and the mail obtaining unit 724 is an example of the reception unit (output data reception unit). One or more of the address confirmation unit 12 and the user name identification unit 83 is an example of the identification unit. The user name is an example of a user-identification data. The PIN code is an example of the data-identification data. That is, the PIN code is generated with respect to each print request. Therefore, the PIN code also serves as data that identifies a target print data. One or more of the print information generation unit 14 and the print information generation unit 84 is an example of the storage unit. One or more of the mail reply unit 16, the mail reply unit 86, the PIN code management unit 727 is an example of the notification unit. One or more of the print information providing unit 63 and the print information providing unit 87 is an example of the transmission unit. One or more of the user data storage unit 52 and the user information storage unit 733 is an example of the first storage unit. One or more of the guest data storage unit 19 and the guest data storage unit 734 is an example of the data storage unit. One or more of the print request mail or the target print data included in the print request mail is an example of the mail data. The PIN code management table is an example of the data-identification data storage unit.

The PIN code management unit 727 is an example of the first and second reception units.

With the above-described embodiments of the present invention, output authorization can be provided even for a user having no account for outputting data.

The present invention is not limited to the specifically disclosed embodiments, and variations and modifications may be made without departing from the scope of the present invention.

The present application is based on and claims the benefit of priority Japanese Priority Application No. 2013-099972 filed on May 10, 2013, with the Japanese Patent Office, the entire contents of which are hereby incorporated by reference.

What is claimed is:

1. A data process system including one or more data process apparatuses, the data process system comprising:
   a user data storage unit configured to store user information of one or more first users including user identification data;
   a guest data storage unit configured to store second address data in correspondence with the user-identification data of the first user as a logging target, the logging target being data pertaining to a guest user different from the first user; and
   an output data storage unit configured to store output data in correspondence with the user-identification data or data-identification data;
   a reception unit configured to receive a request data including the output data via a network;
   an identification unit configured to determine whether the request data is for outputting the output data by the first user or by the guest user and specify the user-identification data of the first user in correspondence with the second address data included in the request data when the request data is for outputting the output data by the guest user,
   a notification unit configured to notify the data-identification data via the network; and
   a transmission unit configured to transmit the output data corresponding to the data-identification data received from the guest user via the network;
   wherein in a case where the request data is for outputting the output data by the guest user, the output data storage unit is configured to store the output data in correspondence with the data-identification data and the specified user-identification data of the first user, and
   wherein the specified user-identification data is included in log information that is generated by the one or more data process apparatuses when the guest user outputs the output data by using the data-identification data.

2. The data process system as claimed in claim 1, further comprising:
   a data-identification data storage unit configured to store the data-identification data notified by the notification unit; and
   a first reception unit configured to receive the data-identification data via the network;
   wherein in a case where the data-identification data received by the first reception unit is stored in the data-identification data storage unit, the output data storage unit is configured to store the data-identification data in correspondence with the output data.

3. The data process system as claimed in claim 1,
   wherein the user data storage unit is configured to store the user-identification data and the first address data in correspondence with a first identification data associated with the one or more users, wherein the guest data storage unit is configured to store the user-identification data in correspondence with the first identification data with respect to each of the second address data, wherein the identification unit is configured to identify the first identification data by using an address data of a destination of the mail data and store the first identification data in correspondence with data stored in the user data storage unit or the guest data storage unit, wherein the identification unit is configured to identify the user-identification data based on the data stored in the user data storage unit or the guest data storage unit.

4. The data process system as claimed in claim 3, further comprising a second reception unit configured to receive the first identification data from a terminal via the network;

wherein the notification unit is configured to notify the data-identification data in a case where the first identification data received by the second reception unit is stored in the first storage unit or a case where the identification unit identifies the first identification data by using the address data of the destination of the mail data.

5. A data process method used for a system including one or more data process apparatuses, the data process method comprising the steps of:

storing, in a user data storage unit, user information of one or more first users including user identification data;

storing, in a guest data storage unit, second address data in correspondence with the user-identification data of the first user as a logging target, the logging target being data pertaining to a guest user different from the first user; and storing, in an output data storage unit, output data in correspondence with the user-identification data or data-identification data;

receiving a request data including the output data via a network;

determining whether the request data is for outputting the output data by the first user or by the guest user and specify the user-identification data of the first user in correspondence with the second address data included in the request data when the request data is for outputting the output data by the guest user;

notifying the data-identification data via the network; and transmitting the output data corresponding to the data-identification data received from the guest user via the network, wherein the storing of the output data includes storing the output data in correspondence with the data-identification data and the specified user-identification data of the first user in a case where the request data is for outputting the output data by the guest user, and wherein the specified user-identification data is included in log information that is generated by the one or more data process apparatuses when the guest user outputs the output data by using the data-identification data.

6. The data process method as claimed in claim 5, further comprising:

storing the data-identification data notified by the notifying step; and receiving the data-identification data with a first reception unit via the network;

wherein in a case where the data-identification data received by the first reception unit is stored in the data-identification data storage unit, the output data storage unit is configured to store the data-identification data in correspondence with the output data.

7. The data process method as claimed in claim 5, wherein the user data storage unit is configured to store the user-identification data and the first address data in correspondence with a first identification data associated with the one or more users, wherein the guest data storage unit is configured to store the user-identification data in correspondence with the first identification data with respect to each of the second address data, wherein the identifying step includes identifying the first identification data by using an address data of a destination of the mail data and store the first identification data in correspondence with data stored in the user data storage unit or the guest data storage unit, wherein the identifying step includes identifying the user-identification data based on the data stored in the first or second storage unit.

8. The data process method as claimed in claim 7, further comprising receiving the first identification data from a terminal with a second reception unit via the network;

wherein the notifying step includes notifying the data-identification data in a case where the first identification data received by the second reception unit is stored in the first storage unit or a case where the identifying step identifies the first identification data by using the address data of the destination of the mail data.

9. A data process apparatus comprising:

a guest data storage unit configured to store second address data in correspondence with user-identification data of a first user as a logging target, the logging target being data pertaining to a guest user different from the first user;

a reception unit configured to receive a request data including output data via the network;

an identification unit configured to determine whether the request data is for outputting the output data by the first user or by the guest user and specify the user-identification data of the first user in correspondence with second address data included in the request data when the request data is for outputting the output data by the guest user;

a notification unit configured to notify the data-identification data via the network; and a transmission unit configured to transmit the output data corresponding to the data-identification data received from the guest user via the network, wherein in a case where the request data is for outputting the output data by the guest user, an output data storage unit is configured to store the output data in correspondence with the data-identification data and the specified user-identification data of the first user, and wherein the specified user-identification data is included in log information that is generated by the data process apparatus when the guest user outputs the output data by using the data-identification data.

10. The data process apparatus as claimed in claim 9, further comprising:

a data-identification data storage unit configured to store the data-identification data notified by the notification unit; and a first reception unit configured to receive the data-identification data via the network;

wherein in a case where the data-identification data received by the first reception unit is stored in the data-identification data storage unit, the output data storage unit is configured to store the data-identification data in correspondence with the output data.

11. The data process apparatus as claimed in claim 9,
wherein a user data storage unit is configured to store the user-identification data and the first address data in correspondence with a first identification data associated with one or more users,
wherein the guest data storage unit is configured to store the user-identification data in correspondence with the first identification data with respect to each of the second address data,
wherein the identification unit is configured to identify the first identification data by using an address data of a destination of the mail data and store the first identification data in correspondence with data stored in the user data storage unit or the guest user storage unit,
wherein the identification unit is configured to identify the user-identification data based on the data stored in the first or second storage unit.

12. The data process apparatus as claimed in claim 11, further comprising a second reception unit configured to receive the first identification data from a terminal via the network;
wherein the notification unit is configured to notify the data-identification data in a case where the first identification data received by the second reception unit is stored in the first storage unit or a case where the identification unit identifies the first identification data by using the address data of the destination of the mail data.

* * * * *